(12) United States Patent
Tatarchuk et al.

(10) Patent No.: US 8,603,229 B2
(45) Date of Patent: Dec. 10, 2013

(54) MULTI-ELEMENT STRUCTURED ARRAYS (MESA'S) FOR COST EFFECTIVE AND HIGH EFFICIENCY TREATMENT OF FLUIDS

(75) Inventors: Bruce Tatarchuk, Auburn, AL (US); Ryan A. Sothen, Auburn, AL (US)

(73) Assignee: Auburn University, Auburn, AL (US)

( * ) Notice: Subject to any disclaimer, the term of this patent is extended or adjusted under 35 U.S.C. 154(b) by 199 days.

(21) Appl. No.: 12/290,847

(22) Filed: Nov. 3, 2008

(65) Prior Publication Data

US 2009/0142234 A1    Jun. 4, 2009

Related U.S. Application Data

(60) Provisional application No. 61/001,536, filed on Nov. 2, 2007.

(51) Int. Cl.
*B01D 53/02*    (2006.01)

(52) U.S. Cl.
USPC .................. 96/134; 96/108; 96/132; 96/154; 55/482; 55/486; 55/489; 55/490; 55/DIG. 5

(58) Field of Classification Search
USPC .............. 96/108, 132, 134, 154; 55/482, 486, 55/489, 490, DIG. 5
See application file for complete search history.

(56) References Cited

U.S. PATENT DOCUMENTS

| | | | | |
|---|---|---|---|---|
| 4,181,513 | A | * | 1/1980 | Fukuda et al. ................... 96/153 |
| 5,223,011 | A | * | 6/1993 | Hanni .............................. 55/484 |
| 2004/0200354 | A1 | | 10/2004 | Barris et al. |
| 2004/0255785 | A1 | | 12/2004 | Koslow |

OTHER PUBLICATIONS

Don W. Green et al.,"Perry Chemical Engineers' Handbook", eighth edition, pp. 6-1,6-2,6-6,6-7,6-47 to 6-49, 8-1,8-2,8-5 to 8-7,8-29 to 8-33, 18-82 to 18-85,18-93, 18-94, 18-97 to 18-99, 18-102, 18-103, and 18-112.

Chen, Da-Ren, Pui, David Y. H. and Liu, Benjamin Y.H.,"Optimization of Pleated Filter Designs Using a Finite-Element Numerical Model. In: Aerosol Science and Technology", 1995, vol. 23 (4) pp. 579-590, Particle Technology Laboratory, Mechanical Engineering Department, University of Minnesota, Minneapolis, MN.

\* cited by examiner

*Primary Examiner* — Christopher P Jones
(74) *Attorney, Agent, or Firm* — Haverstock & Owens LLP

(57) ABSTRACT

Multi-Element Structured Arrays (MESAs) present an effective approach to utilizing high pressure drop media that previously were cost prohibitive for use in a traditional filter element. The operational velocity is significantly slowed by the incorporation of numerous elements; thus, eliminating the Darcian flow resistances of the media. The MESAs are readily fitted with two or more replaceable "filter elements" that are able to employ commercially available media, microfibrous entrapped catalyst/sorbent media, unique multilayers and more. A model capable of estimating pressure drop for flow through a pleated filter is able to be used as a design tool to predict minimum initial pressure drop, maximum filtration area, and preferred media properties with respect to permeability versus thickness thus allowing the filtration system's dirt holding capacity, filtration efficiency and operational energy cost and filtration operational and total ownership costs such as blower energy, filter procurement and shipping, maintenance personnel, filter disposal, inventory and storage, cost of money and more to be improved.

22 Claims, 20 Drawing Sheets

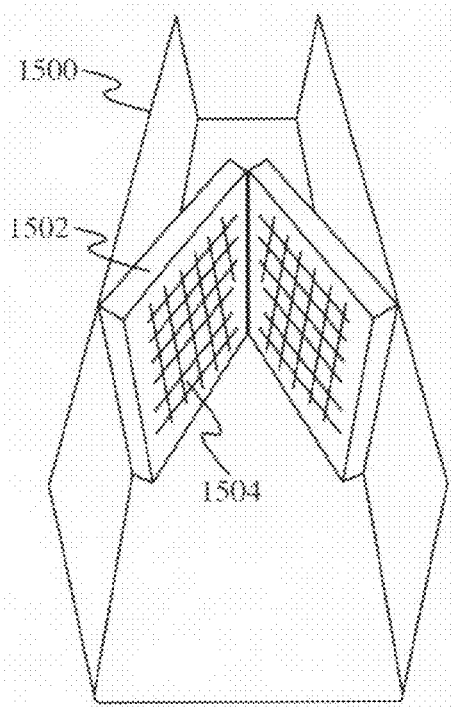
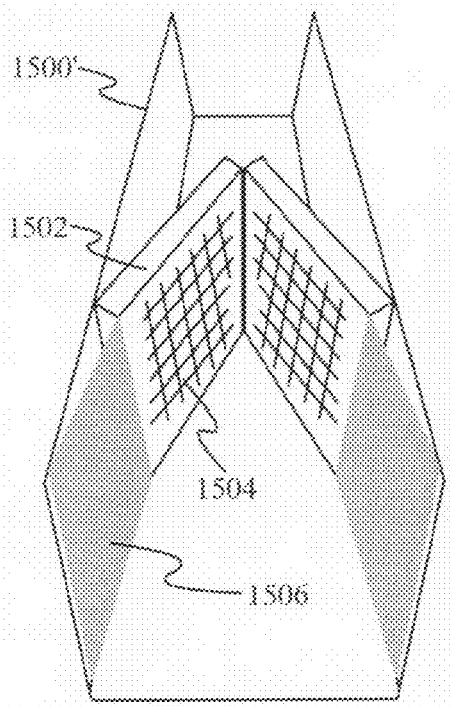
Fig. 15A
Fig. 15B
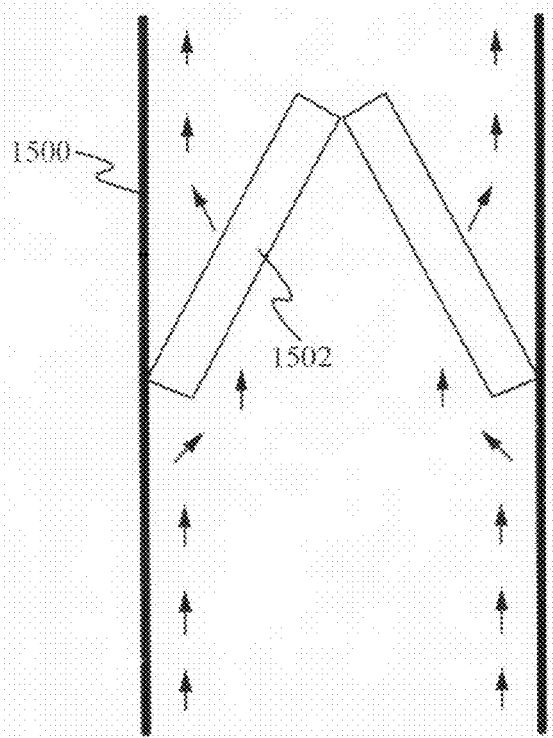
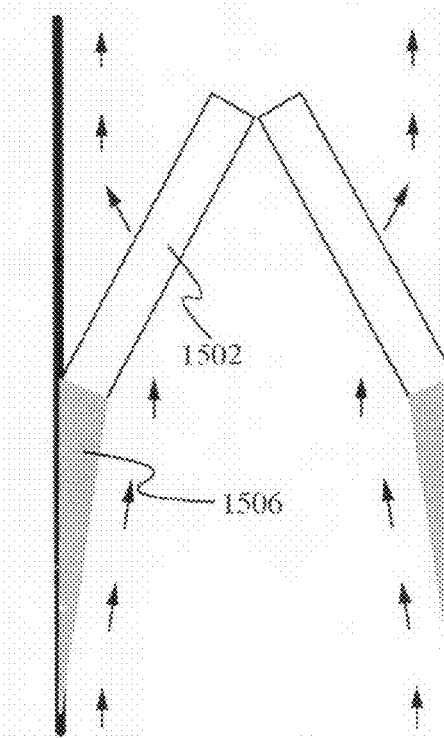
Fig. 15C
Fig. 15D

MULTI-ELEMENT STRUCTURED ARRAYS (MESA'S) FOR COST EFFECTIVE AND HIGH EFFICIENCY TREATMENT OF FLUIDS

CROSS-REFERENCE TO RELATED APPLICATIONS

This application claims the benefit of U.S. Provisional Patent Application Ser. No. 61/001,536, filed Nov. 2, 2007 and entitled MULTI-ELEMENT STRUCTURED ARRAYS (MESA'S) FOR COST EFFECTIVE AND HIGH EFFICIENCY TREATMENT OF FLUIDS; which is hereby incorporated herein by reference in its entirety for all purposes.

GOVERNMENT INTEREST

The U.S. Government has a paid-up license in this invention and the right in limited circumstances to require the patent owner to license others on reasonable terms as provided for by the terms of Contract/Grant No. G00001977 awarded by U.S. Army TACOM LCMC.

FIELD OF THE INVENTION

The present invention relates to the field of filtration systems. More specifically, the present invention relates to the field of multi-element structured arrays.

BACKGROUND OF THE INVENTION

The demand for improved indoor air quality (IAQ) has generated a need for gas phase filtration units capable of removing contaminants such as volatile organic compounds (VOCs), tobacco smoke, carbon monoxide, and formaldehyde. Strategies to remove these harmful contaminants include employing a packed bed or an adsorbent-entrapped filtration media such as microfibrous sorbent-supported media (MSSM). Through a wet-laid process, MSSM's sinterlocked matrix of micron sized fibers is able to entrap sorbent particles with diameters as low as 30 microns leading to better chemical removal efficiency and higher sorbent utilization than a traditional packed bed. The disadvantages of adsorbent-entrapped media are a high pressure drop generated by small, entrapped sorbent particles and a low saturation capacity due to the relatively thin thickness of the media. [Harris et. al, *Wet Layup and Sintering of Metal-Containing Microfibrous Composites for Chemical Processing Opportunities*, Composites Part A: Applied Science and Manufacturing 32(8): 1117-1126 (2001)]

New tactics for building more efficient gas phase filters needs to be researched in order to maximize the usefulness of adsorbent-entrapped media. Pleated and V-bank filters are two designs that are able to improve both pressure drop performance and overall capacity for filtration units made from these materials. By understanding the pressure drop limitations within these filtration systems, additional media and adsorbent material are able to be packaged into a unit to increase the contaminant removal capacity while maintaining an acceptable resistance.

The flow resistance of a filter is a critical design and operational parameter. A large pressure drop across the filter is able to overload the air handler unit and reduce air flow. More importantly, the pressure drop is directly related to the energy consumption of the filtration system. Energy consumption is able to account for 80% of the total expenses while labor and procurement cost account for the remaining 20%. [Arnold et al., *Life-cycle costing of air filtration*, ASHRAE Journal 47 (11):30-32 (2005)]

Numerous filter designs are commercially available, yet pleated filters are one of the more popular styles due to their unique performance benefits. A pleated filter uses a highly folded media to increase the available filtration area and extend the filter's useful life. The extra area also bestows the additional advantage of reducing the pressure drop and energy consumption of the filter. The resistance across a pleated filter fits a second order polynomial composed of a geometric ($K_g V^2_f$) and media ($K_m V_M$) term.

$$\Delta P_F = K_g V^2_f + K_m V_M \tag{1}$$

Empirical and CFD approaches have been attempted by [Chen et al., *Filter Pleating Design for Cabin Air Filtration*. Annual Index/Abstracts of SAE Technical Papers, Technical Paper 960944 (1996)], [Rivers and Murphy, *Air Filter Performance Under Variable Air Volume Conditions*, ASHRAE Transactions 106(2): 131-144 (2000)], [Caesar and Schroth, *The Influence of Pleat Geometry on the Pressure Drop in Deep-Pleated Cassette Filters*, Filtration and Separation 39(9):48-54 (2002)], [Del Fabbro et al., *Air Flows and Pressure Drop Modeling for Different Pleated Industrial Filters*, Filtration and Separation 39(1):34-40 (2002)], and [Tronville and Sala, *Minimization of Resistance in Pleat-Media Air Filter Designs: Empirical and CFD approaches*, HVAC & R Research 9(1):95-106 (2003)] to determine the constants. Although each method produces accurate results, the models are only applicable to the specific filters studied and lack predictive capabilities due to the heavy reliance on empirical data. The contributions of the pleat tips and filter housing, mentioned by [Raber, *Pressure Drop Optimization and Dust Capacity Estimation for a Deep-Pleated Industrial Air Filter Using Small Sample Data*, Filtration and Separation 19(6): 508-511 (1982)], are often neglected from the models.

SUMMARY OF THE INVENTION

Multi-Element Structured Arrays (MESAs) present an effective approach to utilizing high pressure drop media that previously were cost prohibitive for use in a traditional filter element. The operational velocity is significantly slowed by the incorporation of numerous elements; thus, eliminating the Darcian flow resistances of the media. The MESAs are readily fitted with two or more replaceable "filter elements" that are able to employ commercially available media, microfibrous entrapped catalyst/sorbent media, unique multilayers and more. A model capable of estimating pressure drop for flow through a pleated filter is able to be used as a design tool to predict minimum initial pressure drop, maximum filtration area, and preferred media properties with respect to permeability versus thickness thus allowing the filtration system's dirt holding capacity, filtration efficiency and operational energy cost to be improved.

In one aspect, a device comprises a container and a filter contained within the container, wherein characteristics and a configuration of the filter is configured based on a model to optimize efficiency of the filter. The filter comprises a media. The media is optimized to provide at least one of increased sorbent loading and filtration efficiency. The device attains a mathematical maximum of an amount of sorbent, catalyst or filtration medium contained at a specified flow rate and pressure drop. The filter comprises at least one of commercially available media, unique multilayers/laminates of commercially available media, microfibrous entrapped catalyst/sorbent media and laminates, and composite beds of thin packed beds of large particulates followed by layers of microfibrous media. The filter is designed with a particular set of individual media and/or arranged in a particular order to provide high efficiency treatment of a cocktail of contaminants that would otherwise poison or pass through, unimpeded, a single composition element. The filter comprises a plurality of filters. The plurality of filters comprise an even number of filters. The plurality of filters form a V-shape configuration. The plurality of filters are each removable. The device further comprises a set of panels coupled to the plurality of filters, the set of panels configured to improve air flow. The device further comprises a fin coupled to the plurality of filters, the fin configured to improve air flow. The container is employed in a pre-existing ductwork. The model receives as input at least one of a media type, a media thickness, a pleat count, a pleat height, a filter count and a pressure drop. The model determines at least one of a media type, a media thickness, a pleat count, a pleat height, a filter count and a pressure drop.

In another aspect, a system comprises a computing device for generating a model and a filter device developed from the model, wherein characteristics and a configuration of the filter device are configured based on the model to optimize efficiency of the filter device. The filter device comprises a container and a plurality of filters contained within the container, the plurality of filters configured based on the model. The plurality of filters comprise an even number of filters. The plurality of filters form a V-shape configuration. The plurality of filters are each removable. The system further comprises a set of panels coupled to the plurality of filters, the set of panels configured to improve air flow. The system further comprises a fin coupled to the plurality of filters, the fin configured to improve air flow. The container is employed in a pre-existing ductwork. The model receives as input at least one of a media type, a media thickness, a pleat count, a pleat height, a filter count and a pressure drop. The model determines at least one of a media type, a media thickness, a pleat count, a pleat height, a filter count and a pressure drop.

In another aspect, a computer implemented method of using a model to configure a filter device comprises inputting data, generating a model based on the data and configuring a filter device based on the model. The filter device comprises a container and a plurality of filters contained within the container, the plurality of filters configured based on the model. The data includes at least one of a media type, a media thickness, a pleat count, a pleat height, a filter count and a pressure drop. The model includes at least one of a media type, a media thickness, a pleat count, a pleat height, a filter count and a pressure drop.

In another aspect, a computing device comprises a memory for storing an application, the application configured for receiving data and generating a model based on the data, the model configured to develop a filter device and a processing component coupled to the memory, the processing component configured for processing the application. The filter device comprises a container and a plurality of filters contained within the container, the plurality of filters configured based on the model. The data includes at least one of a media type, a media thickness, a pleat count, a pleat height, a filter count and a pressure drop. The model includes at least one of a media type, a media thickness, a pleat count, a pleat height, a filter count and a pressure drop.

In another aspect, a filter configuration comprises a first filter element and a second filter element coupled to the first filter element, wherein characteristics and a configuration of the first and the second filter elements are optimized for filtering efficiency and longevity. The first and the second filter form a V-shape configuration. The first and the second filter are each removable. The configuration further comprises a set of panels coupled to the each of the first and the second filter, the set of panels configured to improve air flow. The configuration further comprises a fin coupled to the first and the second filter, the fin configured to improve air flow.

BRIEF DESCRIPTION OF THE DRAWINGS

FIGS. 15A-D illustrate a filter box and a modified filter box.

DETAILED DESCRIPTION OF THE PREFERRED EMBODIMENT

Figure 1:
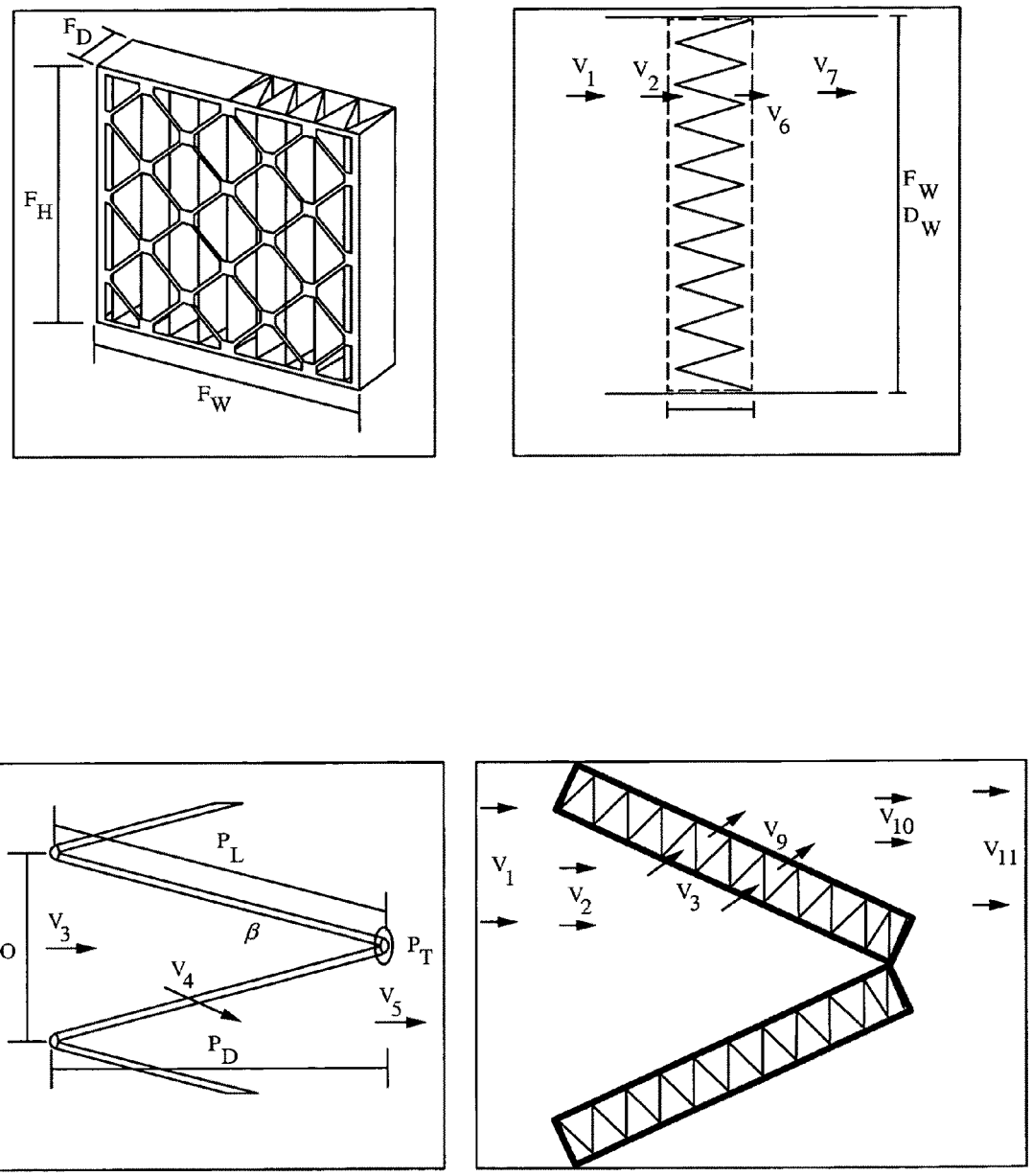
FIG. 1 shows general schematics of a pleated filter and a multi-filter bank.

Multi-Element Structured Arrays (MESA's) are able to be employed in pre-existing ductwork as both a particulate and/or airborne molecular containment filtration system. The use of high resistance filtration/adsorbent media and design architectures that would be otherwise impractical in a traditional filter element are able to be used. With interchangeable filter elements, the unit's framework is able to be reutilized; thus, eliminating the additional cost associated with current sealed units.

An accurate model for use as an analytical design tool capable of predicting initial pressure drop performance of pleated filter units based solely on the thickness and permeability of the media utilized is described herein. Additionally, a filter system is described herein. The effects of a filter's geometry and packaging are quantified in a manner that is able to be universally applied to various pleated filter designs of depths less than 89 mm (3.5 in.). The model is composed of algebraic equations to allow for quick optimization and prediction calculations to improve the utility.

In this method, the total pressure drop of a filter is modeled as a summation of smaller, component resistances. The individual components of a pleated filter are deduced from the proposed air flow pathway introduced by [Raber, *Pressure Drop Optimization and Dust Capacity Estimation for a Deep-Pleated Industrial Air Filter Using Small Sample Data*, Filtration and Separation 19(6):508-511 (1982)]. Each component's influence on the total filter resistance is then formulated through the use of Forchheimer-extended Darcy's Law, Bernoulli's equation, and the equation of continuity.

Since the components of a pleat filter interact with one another, the modeling approach is not able to simply dissect and quantify the exact pressure drop influence of each component. The model is therefore an empirical determination of the relative influence of each term while in the presence of all other terms. This is accomplished by systematically changing design variables, methodically assessing the net increase in the total filter resistance, and then contributing that influence to the appropriate varying term.

Forchheimer-Extended Darcy's Law

In a particulate air filter, the high operational velocities (Reynolds Number>20) often result in non-linear deviations from Darcy's Law for flow through the media. The deviations in filtration media are the product of fiber compression due to the air's inertial force compressing the media's fibers together at higher operational velocities. The compression changes the internal void volume and tortuosity of the media leading to higher superficial velocities, decreased permeability, and a non-linear increase in total resistance.

A practical method to account for the non-Darcian behavior is the addition of a second-order term to Darcy's Law. Equation 2 is known as a Forchheimer-extended Darcy's law. The "A" term is equivalent to the Darcy's Law constant ($\mu L/K$). The second constant, "B," accounts for the non-linear deviation due to inertial effects.

$$\Delta P = AV_M + BV_M^2 \quad (2)$$

Various theoretical equations exist that attempt to relate the physical significance of the second media constant, but these theories require extensive knowledge of the media's fiber dimensions and packing densities [Rivers and Murphy, *Air Filter Performance Under Variable Air Volume Conditions*, ASHRAE Transactions 106(2):131-144 (2000)]. The research presented by Rivers and Murphy demonstrates the complexity and difficulty in accurately modeling media performance with these theories. Since the primary objective of the model is to identify and determine the resistances generated by the geometric design parameters and not the media, it is preferable to model the media constants by a quick, empirical approach that will not introduce as much theoretical error.

Bernoulli's Equation

The mechanical energy balance is a summation of kinetic, potential, mechanical, compressive, and viscous energy terms. Bernoulli's equation is a reduced version of the mechanical energy balance that assumes incompressible, steady-state flow while maintaining a control volume with stationary, solid boundaries. Bernoulli's equation is able to be further simplified by eliminating elevation change within the control volume, operating at turbulent conditions, and removing all mechanical work. When applied between two points, the following equation results:

$$\Delta P = P_1 - P_2 = \tfrac{1}{2}\rho(V_2^2 - V_1^2) + L_V \quad (3)$$

$$L_V = \tfrac{1}{2}\rho K V^2 \quad (4)$$

The viscous loss term ($L_V$) accounts for the change of mechanical energy into heat due to viscous forces. It is determined by simultaneously solving the mechanical energy and momentum balance or through experimental measurements. The K values, also referred to as coefficients of friction, are functions of either geometry, Reynolds number, or both. The V term is a reference velocity on which the coefficient is based. This reference velocity is an arbitrary choice, yet it must be either the entrance or exit velocity into the control volume. K values have previously been computed for flow systems such as a sudden contraction ($K_C$), sudden expansion ($K_E$), and flow through a perforated plate ($K_G$).

$$K_C = 0.5 \times (1 - A_{Free}/A_{Total})^{0.75} \quad (5)$$

$$K_E = (1 - A_{Free}/A_{Total})^2 \quad (6)$$

$$K_G = (1.707 - A_{Free}/A_{Total})(A_{Free}/A_{Total})^{-2} \quad (7)$$

Flow Pattern in a Single and Multi-Filter Bank

Air travels through seven or thirteen regions of varying cross-sectional flow area in a pleated filter (FIG. 1). It is assumed that a uniform flow profile exists in the upstream duct before the filter. A typical pleated filter employs a grating to increase the structural integrity of the filter and the pleats. The flow is contracted by the grating resulting in an increased velocity. The air expands back out after the grating, yet is quickly contracted for a second time as it is channeled around the pleat tips and into the pleats.

Once inside the filter's pleats, the air flow begins to split and changes directions to allow entrance into the media at an angle perpendicular to the media's surface. The air expanses out onto the media's surface area after the direction change. The proposed flow pattern through the filter's pleats is very similar to the flow in a converging or diverging way.

The fourth region is the media's accessible surface area. The area does not include the small portion of media that will be pinched shut in the pleat tips. After flowing through the media, the air flow then follows an identical yet reversed path out of the filter system back into the downstream duct. The flow system for a single filter is modeled within the multi-filter system; therefore, a single filter is able to be appropriately modeled by neglecting the first and last two terms of the multi-filter model.

Pressure Drop Assessment of Flow System

The total pressure drop through a pleated filter was modeled as a summation of individual resistances. The individual resistances were formulated by applying Bernoulli's Equation or Forchheimer-extended Darcy's Law to the seven proposed flow areas outline above. The following system of equations resulted:

| | |
|---|---|
| Across Front Grating: | $\Delta P_1 = \tfrac{1}{2}\rho[(V_2^2 - V_1^2) + K_G V_1^2]$ |
| Flow from Grating to Pleat Inlet: | $\Delta P_2 = \tfrac{1}{2}\rho[(V_3^2 - V_2^2) + K_C V_3^2]$ |
| Flow from Pleat Inlet to Media Surface: | $\Delta P_3 = \tfrac{1}{2}\rho[(V_4^2 - V_3^2) + K_{P1} V_3^2]$ |
| Flow through Media: | $\Delta P_4 = AV_4 + BV_4^2$ |
| Flow from Media Surface to Pleat Outlet: | $\Delta P_5 = \tfrac{1}{2}\rho[(V_5^2 - V_4^2) + K_{P2} V_5^2]$ |
| Expansion from Pleat Outlet into Grating: | $\Delta P_6 = \tfrac{1}{2}\rho[(V_6^2 - V_5^2) + K_E V_5^2]$ |
| Across Back Grating: | $\Delta P_7 = \tfrac{1}{2}\rho[(V_7^2 - V_6^2) + K_G V_7^2]$ |

$$\Delta P_F = \Sigma \Delta P_i = \Delta P_1 + \Delta P_2 + \Delta P_3 + \Delta P_4 + \Delta P_5 + \Delta P_6 + \Delta P_7 \quad (8a)$$

Figure 2:
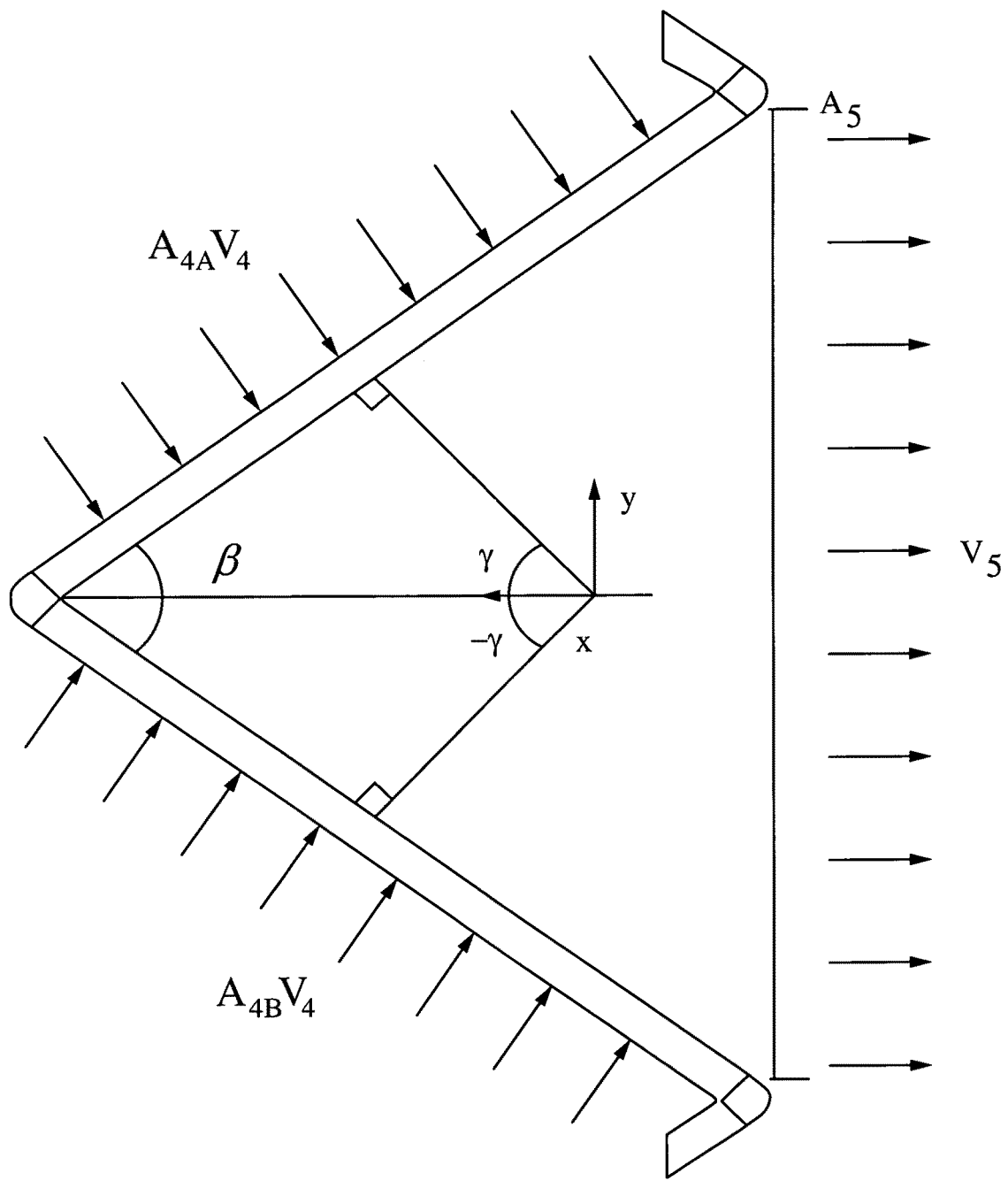
FIG. 2 shows a control volume of a pleat.

$K_C$, $K_E$, and $K_G$ are previous published coefficients of friction computed by Equations 5, 6, and 7. $K_{P1}$ and $K_{P2}$ are the friction coefficients for flow in the upstream and downstream pleats. A new coefficient's formula is able to be identified by simultaneously solving the mechanical energy balance and the momentum balance. FIG. 2 is the pleat control volume used to solve the balances for the downstream pleat coefficient.

Momentum Balance $$d\Gamma/dt = [V_1W_1+P_1A_1]U_i - [V_2W_2+P_2A_2]U_i + F_{s \to f} + mg$$

Force of Fluid on the Solid
Forces in y-Direction $$Fy = \tfrac{1}{2}(V_4W_{4A}+P_4\tfrac{1}{2}A_4)\sin(\gamma) + \tfrac{1}{2}(V_4W_{4B}+P_4\tfrac{1}{2}A_4)\sin(-\gamma) - 0 = >0$$

Forces in x-Direction $$Fx = \tfrac{1}{2}(V_4W_{4A}+P_4\tfrac{1}{2}A_4)\cos(\gamma) + \tfrac{1}{2}(V_4W_{4B}+P_4\tfrac{1}{2}A_4)\cos(-\gamma) - (V_5W_5+P_5A_5)\cos(\gamma) = \sin(\beta) = 0.5A_5/0.5A_4$$

$$Fx = \rho V_4^2 A_4(A_5/A_4) + P_4 A_4(A_5/A_4) - \rho V_5^2 A_5 - P_5 A_5$$

$$Fx = \rho(V_4^2 - V_5^2)A_5 - (P_5-P_4)A_5$$

$$F_{f \to s} = (Fx^2+Fy^2)^{1/2} \text{ Assuming } F_{f \to s} \text{ is zero}$$

$$0 = \rho(V_4^2-V_5^2)A_4 - (P_5-P_4)A_5$$

$$(P_5-P_4) = \rho(V_4^2-V_5^2)$$

Mechanical Energy Balance $$\tfrac{1}{2}(V_5^2-V_4^2)+(1/\rho)(P_5-P_4)+Lv=0$$

$$Lv = \tfrac{1}{2}(V_4^2-V_5^2) - (1/\rho)(P_5-P_4)$$

Substituting in Momentum Balance Solution $$Lv = \tfrac{1}{2}(V_4^2-V_5^2) - (1/\rho)[\rho(V_4^2-V_5^2)]$$

$$Lv = \tfrac{1}{2}(V_5^2-V_4^2) \quad V_4^2 = (V_5A_5/A_4)^2$$

$$Lv = \tfrac{1}{2}V_5^2[1-(A_5/A_4)^2]$$

$$K_{P2} = [1-(A_5/A_4)^2] \text{ where the reference velocity is } V_5$$

In order to solve the balances, two erroneous assumptions had to be made to simplify the equations. Although the force of the fluid on the surface ($F_{f \to s}$) is not able to be readily quantified, it is incorrect to simply neglect the term. Second, assuming the air flow will enter and exit the media at a strictly perpendicular angle is doubtful. Both solutions do indicate that the coefficient is a function of the pleating ratio (ratio of $A_5/A_4$ or $A_3/A_4$).

An empirical approach was taken to determine the pleat coefficients' formulas since they could not be determined by the analytical manner employed. The individual contributions of $K_{P1}$ and $K_{P2}$ could not be experimentally separated and analyzed due to the upstream and downstream pleat symmetry. The two coefficients were combined into a single coefficient since they share identical geometries and experience the same velocities. The newly formed pleat coefficient ($K_P$) was then substituted in their place. The series is able to be reduced by replacing all downstream velocities with their reciprocal upstream velocities. The seven terms are able to be summed and rearranged into the following model:

$$\Delta P_F = \tfrac{1}{2}\rho[(2K_G)V_1^2+(K_C+K_E+K_P)V_3^2]+AV_4+BV_4^2 \quad (9a)$$

Modeling a Multi-Element Pleated Filter Bank (MEPFB)

The total resistance through a bank was compiled as a summation of the eleven individual resistances outlined above. The following series of equations was generated by applying Bernoulli's Equation or Forchheimer-extended Darcy's Law to each section:

| | |
|---|---|
| Flow into Slot: | $\Delta P_1 = \tfrac{1}{2}\rho[(V_2^2-V_1^2)+K_{C1}V_2^2]$ |
| Flow from Slot Inlet to Filter Face: | $\Delta P_2 = \tfrac{1}{2}\rho[(V_3^2-V_2^2)+K_{S1}V_3^2]$ |
| Across Front Grating: | $\Delta P_3 = \tfrac{1}{2}\rho[(V_5^2-V_3^2)+K_GV_3^2]$ |
| Flow from Grating to Pleat Inlet: | $\Delta P_4 = \tfrac{1}{2}\rho[(V_6^2-V_5^2)+K_{C2}V_6^2]$ |
| Flow from Pleat Inlet to Media Surface: | $\Delta P_5 = \tfrac{1}{2}\rho[(V_7^2-V_6^2)+K_{P1}V_6^2]$ |
| Flow through Media: | $\Delta P_6 = AV_7+BV_7^2$ |
| Flow from Media Surface to Pleat Outlet: | $\Delta P_7 = \tfrac{1}{2}\rho[(V_8^2-V_7^2)+K_{P2}V_8^2]$ |
| Expansion from Pleat Outlet into Grating: | $\Delta P_8 = \tfrac{1}{2}\rho[(V_9^2-V_8^2)+K_{E1}V_8^2]$ |
| Across Back Grating: | $\Delta P_9 = \tfrac{1}{2}\rho[(V_{11}^2-V_9^2)+K_GV_{11}^2]$ |
| Flow from Filter Face to Slot Outlet: | $\Delta P_{10} = \tfrac{1}{2}\rho[(V_{12}^2-V_{11}^2)+K_{S2}V_{11}^2]$ |
| Flow out of Slot: | $\Delta P_{11} = \tfrac{1}{2}\rho[(V_{13}^2-V_{12}^2)+K_{E2}V_{12}^2]$ |

$$\Delta P_T = \Sigma \Delta P_i = \Delta P_1+\Delta P_2+\Delta P_3+\Delta P_4+\Delta P_5+\Delta P_6+\Delta P_7+\Delta P_8+\Delta P_9+\Delta P_{10}+\Delta P_{11} \quad (8b)$$

$K_{P1}$ and $K_{P2}$ are the coefficients of friction for flow through the pleat upstream and downstream of the media. Although the coefficient of friction is able to be calculated by simultaneously solving the mechanical energy balance and the momentum balance, the equations are not able to be mathematically solved for flow through a pleat without making erroneous assumptions.

Since the pleat's upstream and downstream geometries are identical, the individual contributions of $K_{P1}$ and $K_{P2}$ are not able to be experimentally separated and analyzed. The two constants are combined into a single coefficient $K_P$ that is able to be empirically determined. Likewise, $K_{S1}$ and $K_{S2}$ are the coefficients of friction for flow in the slot upstream and downstream of the filters and are merged into one coefficient ($K_S$).

With the equation of continuity assumed valid, the series is able to be greatly simplified by replacing the downstream velocities with their reciprocal upstream velocities. The series of equations are able to be reduced and re-written into the following form:

$$\Delta P_F = \tfrac{1}{2}\rho[(2K_{C1}+K_{E2})V_2^2+(2K_G+K_S)V_3^2+(K_{C2}+K_{E1}+K_P)V_6^2]+AV_7+BV_7^2 \quad (9b)$$

Equipment & Procedure
Media Test Rig

Figure 3:
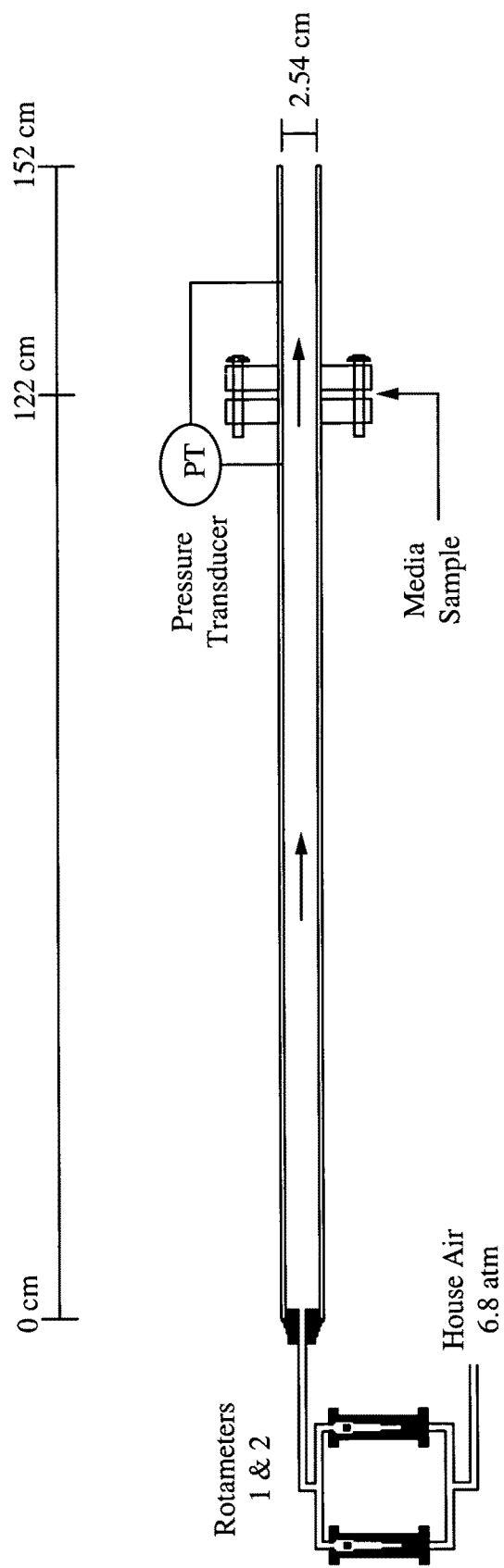
FIG. 3 shows a media test rig.

A media test rig is shown in FIG. 3. The media constants are determined using a 25.4 mm (1 in) diameter duct supplied by house air at $6.9 \times 10^5$ Pa (100 psi). A significantly large duct length-to-diameter ratio of 48 is used to generate a uniform, upstream velocity profile. A media sample is held in place by two plates tightened together by nut and bolt assemblies. A 305 mm (6 in) long outlet section is located downstream of the media sample to prevent additional flow resistance from a sudden expansion out of the tube.

Air flow to the rig is controlled by two rotameters connected in parallel to produce a stable, maximum face velocity of 2.48 m/s (490 fpm). The rotameters are determined to be accurately calibrated by a volumetric displacement test. Pressure drop measurements are obtained with an Invensys IDP10-T differential pressure transmitter connected to a pressure tap located 50 mm (2 in) upstream and 125 mm (5 in) downstream of the media sample.

Media Data Acquisition

Three pressure drop tests were performed on each of the five media types employed. Media samples were obtained by disassembling manufactured filters which included thermally bonded, polyolefin fibers manufactured by Kimberly-Clark. Each test obtained multiple data points over the rotameters' velocity range. A data point included setting the rotameter to a flow rate and measuring the corresponding pressure drop. A control run with no media sample detected a small amount

[0.75 Pa at 2.48 m/s] of background resistance. The resistance corresponded well to Darcy-Weisbach Equation for the whole flow range examined, and the additional resistance was subtracted from the total measured media resistance.

Figure 4:
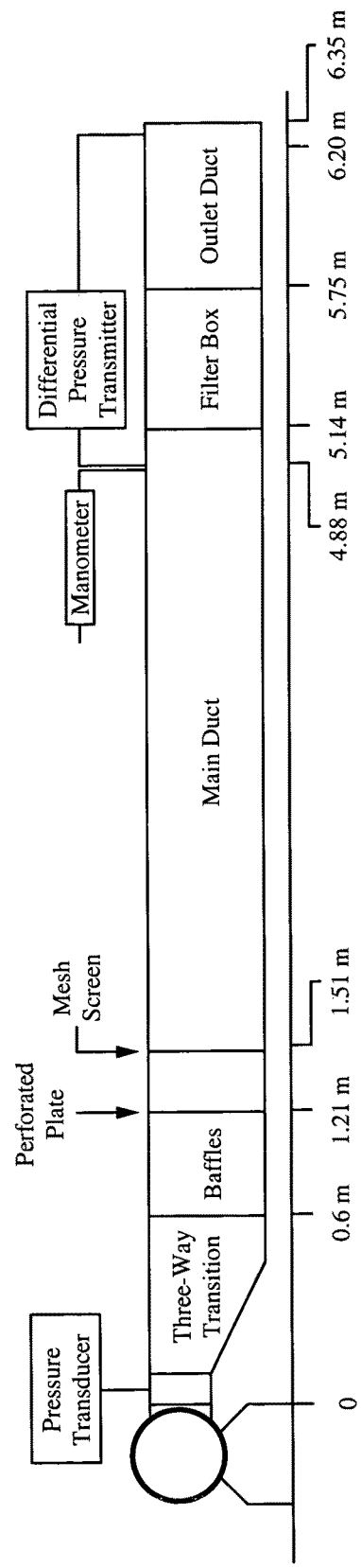
FIG. 4 shows a filter test rig.

Air is supplied to the filtration test rig, shown in FIG. 4, by a Dayton unit with a 15 inch impellor powered by a 3 Hp Hitachi motor. The motor is controlled by a Hitachi SJ200 inverter with a range of zero to sixty hertz at 0.1 Hz increments. At the blower outlet, a pressure tap coupled with an Omega PX 154-010DI pressure transducer monitors resistance across the blower.

The baffles, flow straighteners, and main duct generate a uniform airflow into the filtration section. The main duct, filter box, and outlet duct all possess cross sections of 491 mm×491 mm (19.5 in.×19.5 in.) to reduce any flow disturbances between the segments. The filter box holds and seals the filters into place with a metal frame. The frame has a height of 3 mm; thus, it fits behind the filter's housing without interfering with the pressure measurements. The top of the filter box contains a window to verify that the pleat integrity remained intact during the experiments. Pressure drop across the filtration section is monitored by a Dwyer Mark II manometer and an Invensys IPO10 differential pressure transmitter. The equipment is coupled upstream into the duct by 3 mm (⅒th in) pressure taps located 250 mm (10 in) before the filter test box. The manometer's downstream connection is left open to the room's atmosphere. The transmitter's outlet is linked to pressure taps located 150 mm (6 in) before the end of the outlet section. The outlet section prevents an increased pressure drop due to sudden expansion out into the room. A NIST calibrated Extech #451104 vane-anemometer monitors exit velocity and temperature at the outlet of the test rig. Velocity measurements are conducted by the manner nine-point grid procedure outlined in ASHRAE Standard 52.2 Section 5.2 (ASHRAE 2007).

For single filter tests, the filters are held and sealed into place by positioning a metal frame in the filter box. The frame has a height of 3 mm, thus it fits behind the filter's housing without interfering with the pressure measurements. For multi-filter bank tests, the filters are sealed into the filter housing by duct tape or another material. No additional support is needed to maintain the filter bank in position due to the tight fit of the filter box.

Air to the blower is drawn from the room. All tests are performed in an environment of approximately 20° C. (68° F.) and elevation of 215 meters (705 ft) above sea level; therefore, the density of air is assumed to possess a constant valve of 1.16 kg/m3 (0.0725 lb/ft3) throughout the experiments.

Filter Data Acquisition

Experimental data is collected by setting the inverter to the desired frequency and recording the corresponding values from the pressure transducer, manometer, differential pressure transmitter, and vane-anemometer. The process is repeated at fifteen uniformly spaced data points between five and forty hertz. The 15 point test is duplicated for each filter. After the data is collected for a filter, a pressure drop curve is generated by plotting face velocity versus pressure drop. The face velocity is calculated from the blower curve using the frequency and resistance across the blower. The value is verified by the vane-anemometer measurements. Pressure drop is measured by the pressure cell and cross-checked by the manometer. A regression line is fitted to each pressure drop curve for use in data analysis and to eliminate individual data discrepancies. The small background resistance of the system is removed from the regression line by use of the Darcy-Weisbach equation.

Determination of Model Parameters

In some embodiments, the models are composed of seven coefficients of friction in addition to the media constants. The objective of the experimental program is to verify the validity of utilizing previously published coefficients to model particular aspects of the filter design as well as to empirically determine a new coefficient for friction encountered in the pleat. Since the media constants will be unique and vary with the media used in the filter, the approach begins by measuring the media constants (A & B) and thickness for all materials utilized in the research. The previous published coefficients ($K_G$, $K_C$, and $K_E$) are then shown to be applicable. The pleat coefficient for a single filter is empirically determined from empirical $\Delta P_F$ versus face velocity data. This technique is based on Rivers and Murphy's approach to identify the constants N and $K_G$ from their model. A more universal coefficient is developed by determining $K_P$ for a multitude of filter designs. In some embodiments, additional coefficients are confirmed or determined as well.

Media Constants

Figure 5:
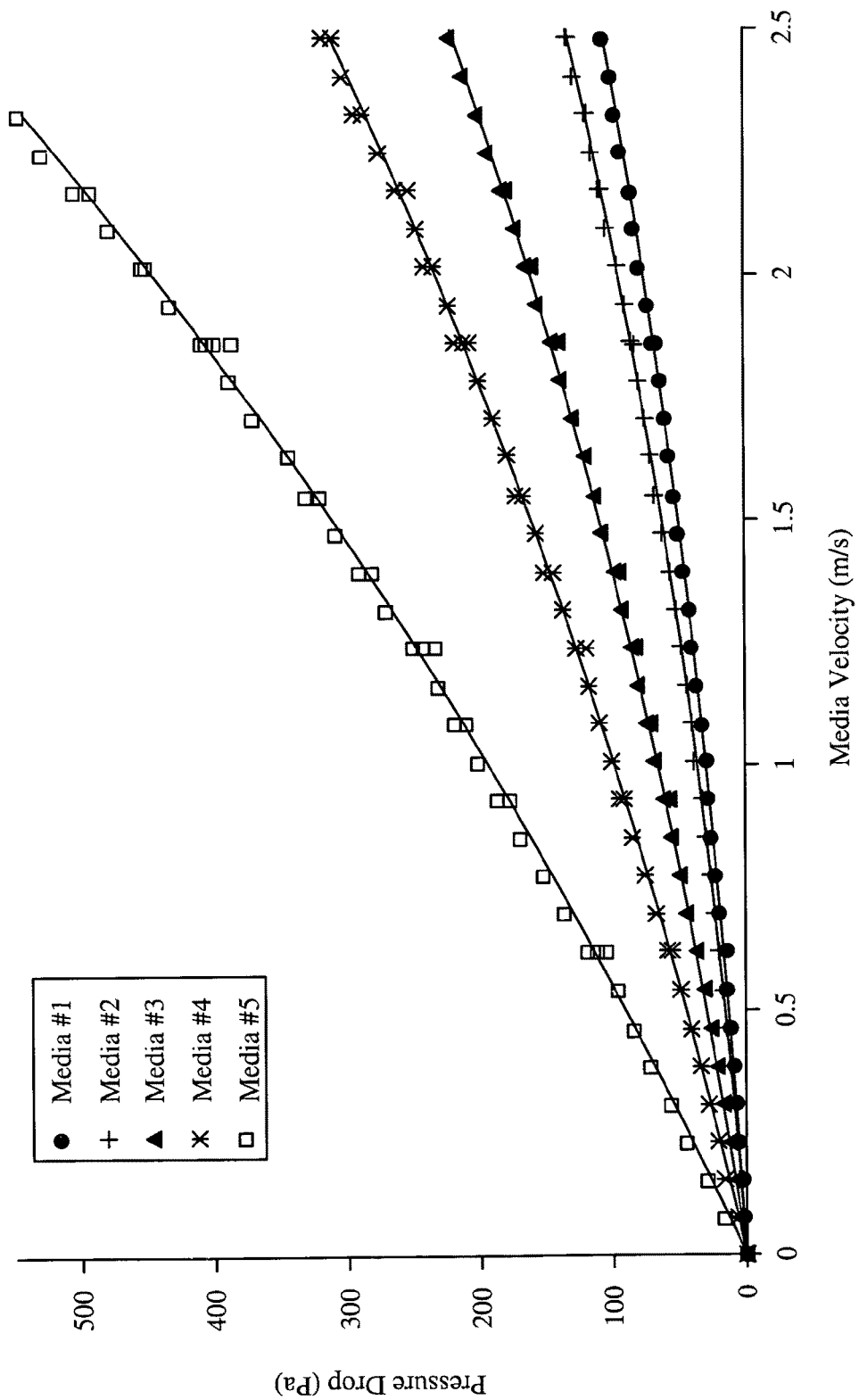
FIG. 5 presents the resistance versus face velocity results obtained from flat media samples.

FIG. 5 presents the resistance versus face velocity results obtained from flat media samples. The individual points on the graph represent the experimentally collected data. The fitted lines correspond to second-order polynomials; thus, the use of Equation 2 is preferred to a linear Darcy's Law.

TABLE 1

Media Summary

| Media | Thickness, mm | A, Pa·s/m | B Pa·s$^2$/m$^2$ | R$^2$, dimensionless |
|---|---|---|---|---|
| #1 | 0.5 | 8.8 | 20.6 | 0.998 |
| #2 | 0.5 | 11.6 | 24.6 | 0.998 |
| #3 | 1.6 | 16.7 | 47.9 | 0.998 |
| #4 | 1.0 | 18.2 | 81.1 | 0.999 |
| #5 | 1.1 | 29.5 | 164.4 | 0.999 |

The Grating Coefficient of Friction ($K_G$)

The Handbook of Hydraulic Resistance computes the coefficient of friction for fluid flowing through a shaped, perforated plate by Equation 7. In order to verify that the filter housing is able to be modeled by the same formula, the frame is altered and the corresponding measured pressure deviation is compared to the calculated deviation.

Figure 6:
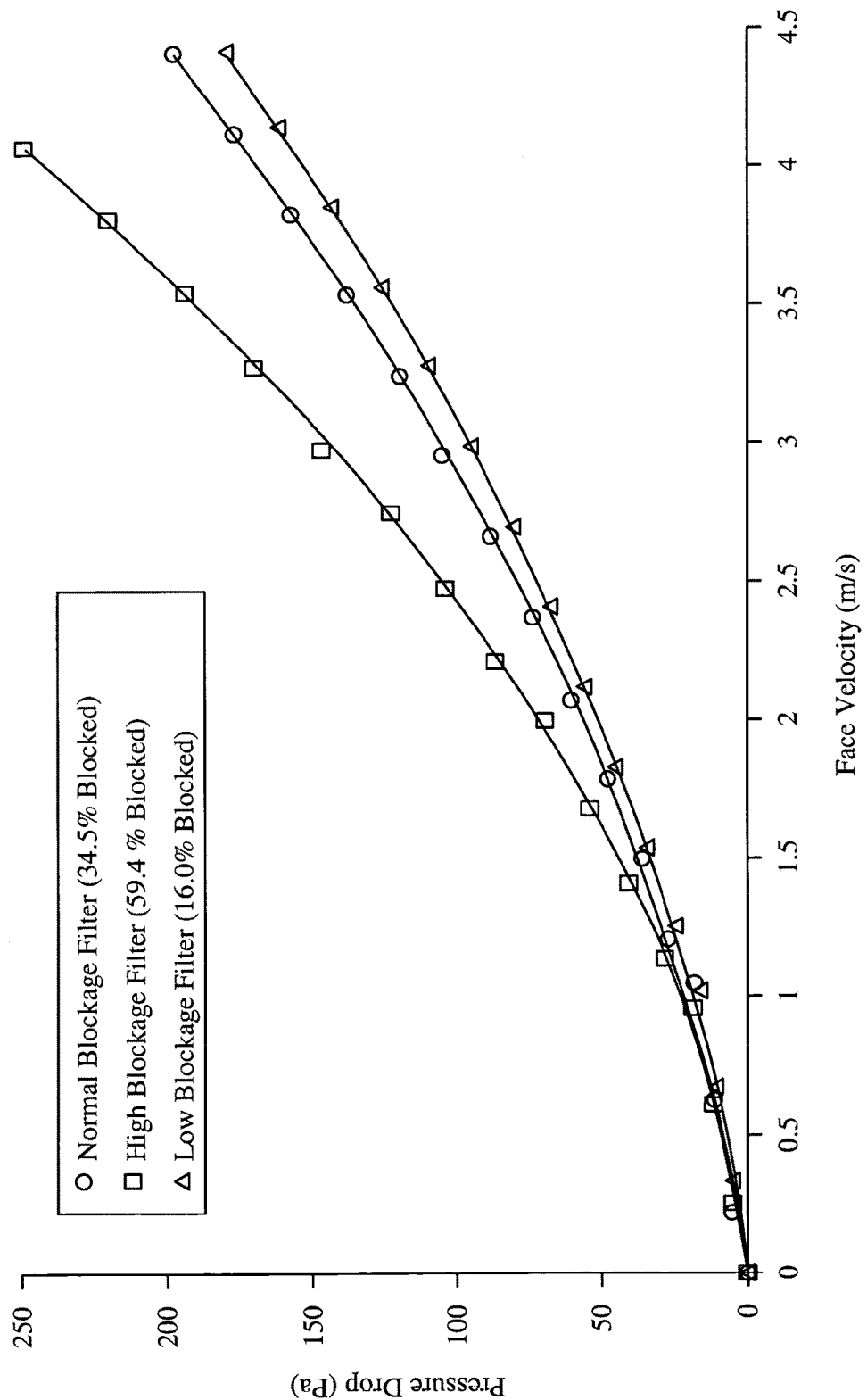
FIG. 6 shows a graph of pressure drop curves for various frontal blockages.

The filter utilized in the grating experiments includes of a #2 media with 22 pleats per filter and dimensions of 491 mm×491 mm×21 mm (19.5 in.×19.5 in.×0.85 in.). The filter's normal housing is composed of a diamond grid that blocked 34.5% of the flow area. Additional grating is uniformly added to the filter's front to increase the blocked flow area from 34.5% to 59.4%. Subsequently, the filter's grating is removed resulting in only 16.0% of the flow area blocked. The graph of the pressure drops versus face velocity is plotted in FIG. 6 for each grating configuration. The markers represent the observed data and the solid lines are Excel-fitted regression lines.

Since the same filter is utilized in all three tests, the observed pressure difference between the curves is generated solely by the grating modification. The additional resistance generated by the extra grating is able to be quantified using the low blockage filter curve as a reference. This observed increase in flow resistance between the normal blockage and the low blockage filter is then compared to the expected pressure increase computed using Equation 4 with the friction coefficients determined by Equation 7. Below, Equation 7 is used to calculate the friction coefficients for the various blockage profiles.

For Normal Blockage: $KG=(1.707-0.655)/(0.655)^{-2}=2.50$

For Low Blockage: $KG=(1.707-0.840)/(0.840)^{-2}=1.23$

For High Blockage: $KG=(1.707-0.406)/(0.406)^{-2}=7.89$

Figure 7A:
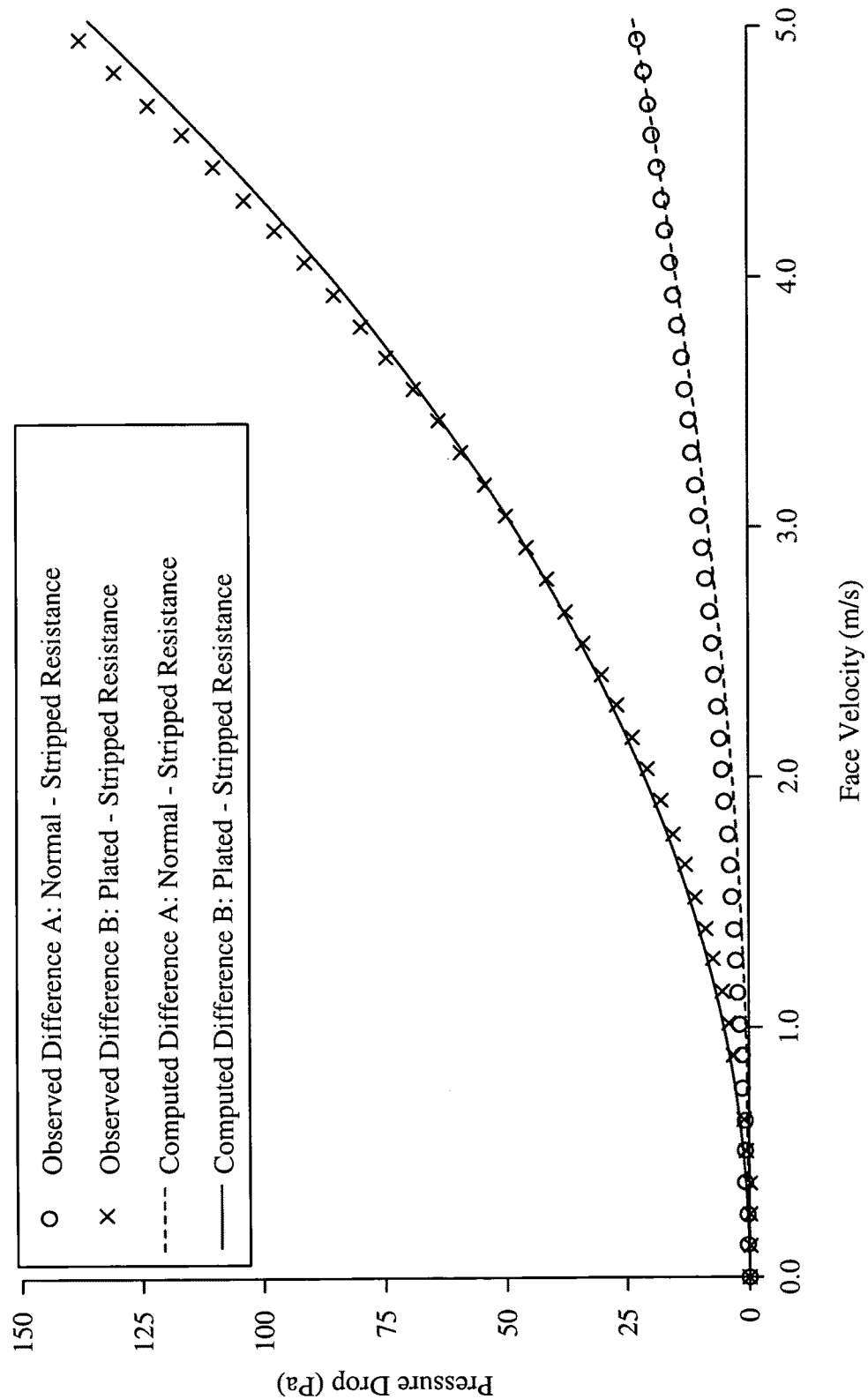
FIG. 7A shows a correlation plot of observed versus calculated grating resistance.

This calculation is repeated for the difference between the high blockage and low blockage filter. The results of the measured differences and calculated differences are shown in FIG. 7A.

Since the computed and observed differences overlap, Equation 4 in conjunction with Equation 7 is able to be used to adequately predict the pressure loss generated by the filter's housing. Similar results are obtained after modifying the grating on the back of the filter as well as when filter types S & T are subjected to the experiment. Although the grating resistance is observed to be independent of pleat count and permeability within the parameter space explored, caution is taken when applying these equations on lower permeability or higher pleated systems such as a mini-pleat panels. The unique design of such filters are able to cause the flow field around the grating to be influenced by the pleats; thus, the use of Equation 7 will no longer be valid.

The Entrance Coefficient of Friction ($K_{CB}$)

The added resistance for entering the bank is accurately modeled. This is confirmed by systematically removing the influence of the blockage and observing the deviation in resistance. The deviation is then compared to the calculated resistance to verify the use of the theoretical friction factor.

The influence of the bank's entrance is removed by adding a long, gradual contraction to the front of the bank. The gradual, contracting slope lowers the air friction and eddies normally encountered at the front of the bank due to the element blockage. Due to the long length and the overall small decrease in area, the coefficient of friction for the transition is reduced to zero. Thus, the contraction at the bank's front and the associated resistance are eliminated.

The Exit Coefficient of Friction ($K_{EB}$)

An analogous test is preformed for the expansion out of the filter bank. A normal pressure drop curve was measured followed by a second pressure drop curve for a modified design. The modified outlet design changes the sudden expansion out of the bank into a gradual transition by adding a tail fin composed of two 491 mm (19.5") high by 585 mm (23") wide boards to the back of the filter's edges. Since the same bank is used in both experiments, the observed differential between the two configurations is able to be compared to the calculated pressure drop expected by a sudden expansion. The experiment is performed on a "V" bank loaded with 491 mm×491 mm×89 mm filter elements.

The Slot Coefficient of Friction ($K_S$)

The slot friction coefficient is determined through the use of empirical data spanning 30 MEPFB systems. Equation 9b is able to be reorganized and modified into the following linear form:

$$\Delta P_F = \tfrac{1}{2}\rho[(2K_{C1}+K_{E2})V_2^2+(2K_G)V_3^2+(K_{C2}+K_{E1}+K_P)V_5^2]+BV_6+AV_6^2=K_s(\tfrac{1}{2}\rho V_3^2)$$

Data relating $\Delta P_F$ versus face velocity data are acquired for a specific bank. All velocities in the above equation are calculated from the face velocity using the equation of continuity and ratio of allowable flow areas. The friction coefficients are calculated based on known geometric dimensions as previously described. The slot coefficient for a particular bank is solved by plotting the calculated values on the left-hand side versus the reference velocity term ($\tfrac{1}{2}V_3^2$). The process is repeated for various element types to improve the versatility of the coefficient.

Figure 7B:
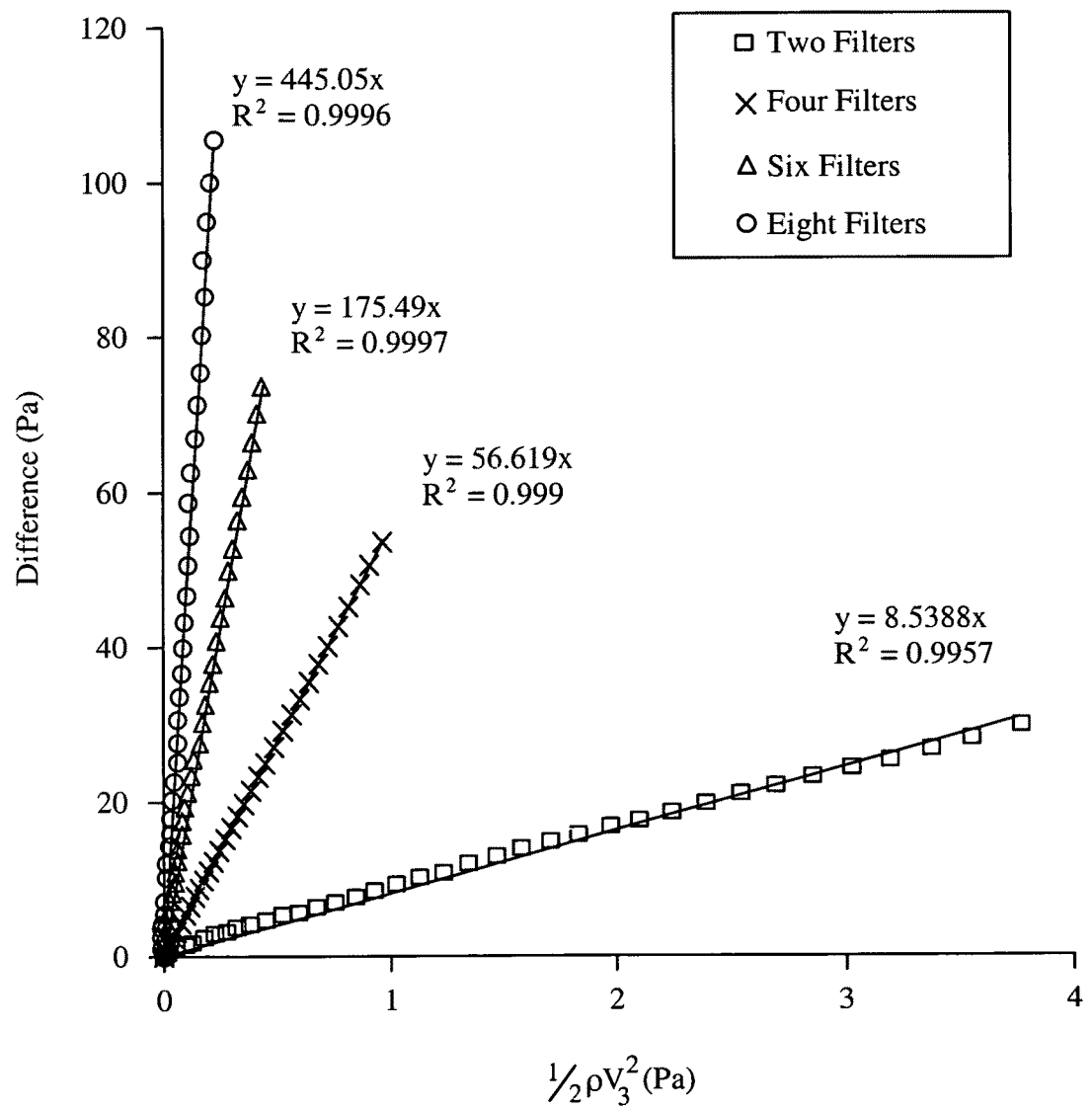
FIG. 7B shows a plot of slot coefficients.

FIG. 7B shows the slot coefficient results obtained by loading a filter box with two, four, six and eight filters composed of MERV 8 media with 47 pleats. Each line is a least-square regression line forced through zero. The slope and degree of fit are present to the right of each line.

Similar to the pleat coefficient, the slot coefficient shows a solid correlation between the slot opening over slot depth ratio. This is expected since both the pleat and slot possess similar geometry. The slot coefficient is empirically-determined to be:

$$Ks=10.54*(S_D/S_o)^2$$

The Pleat Tip Assumption

The contraction and expansion into and out of the pleats is assumed to be accurately modeled by Equation 4 using friction coefficients obtained by Equation 5 and Equation 6. For the friction coefficients calculations, $$A_{TOTAL}=F_W \times F_H \ \& \ A_{FREE}=(F_W-\text{Pleat Count} \times P_T) \times F_H$$

It would be exceedingly difficult to experimentally alter a pleat tip and analyze the resulting contribution to resistance without inadvertently affecting other resistances. The assumption that a pleat tip acts as a wall is based on Darcy's Law. When a media is pleated, the porous material is folded on top of itself generating a pleat tip of increased thickness and/or decreased permeability. Either an increase in media thickness or a decrease in permeability will result in a path of greater flow resistance according to Darcy's Law. Air flow through the pleat tip is therefore assumed to be blocked due to this heightened resistance and will be channeled around the tips and into the pleats.

The Pleat Coefficient of Friction ($K_P$)

The pleat coefficient for a specific filter is determined by obtaining $\Delta P_F$ versus face velocity data over a range of velocities. The model is rearranged into the following linear form:

$$\Delta P_F-\tfrac{1}{2}\rho[(2K_G)V_1^2+(K_C+K_E)V_3^2]+BV_4+AV_4^2=\tfrac{1}{2}\rho K_P V_3^2 \qquad (10)$$

Figure 8:
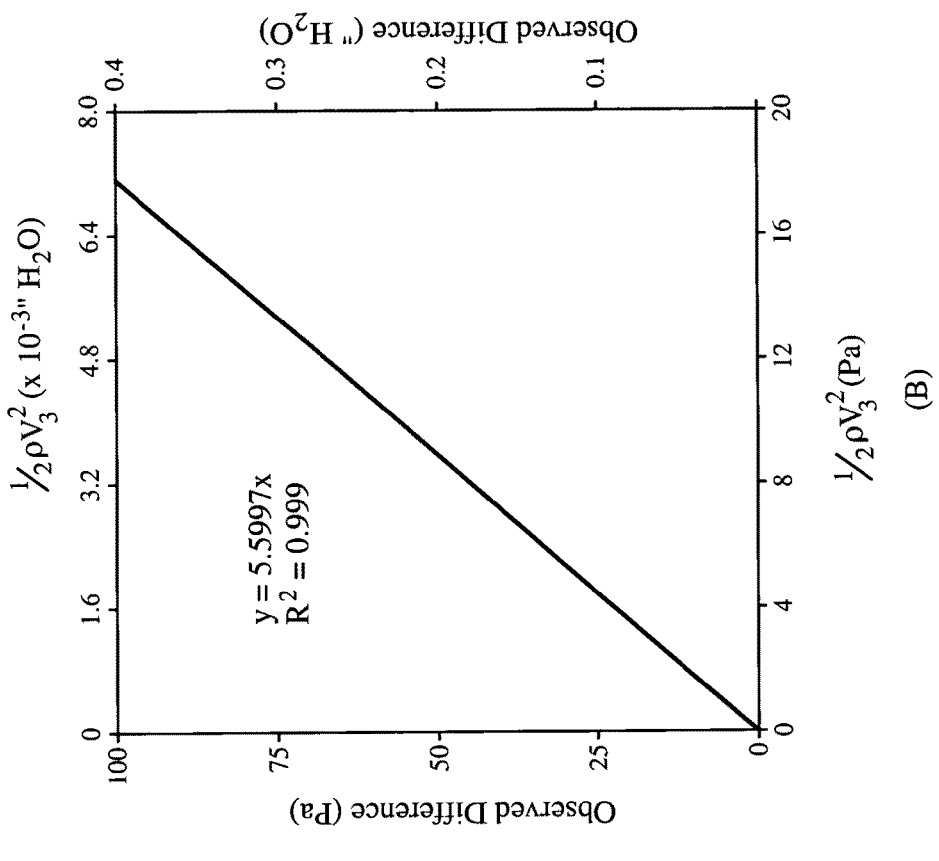
FIG. 8A shows pressure drop curves.
FIG. 8B shows a graph of a pleating coefficient.
Figure 8:
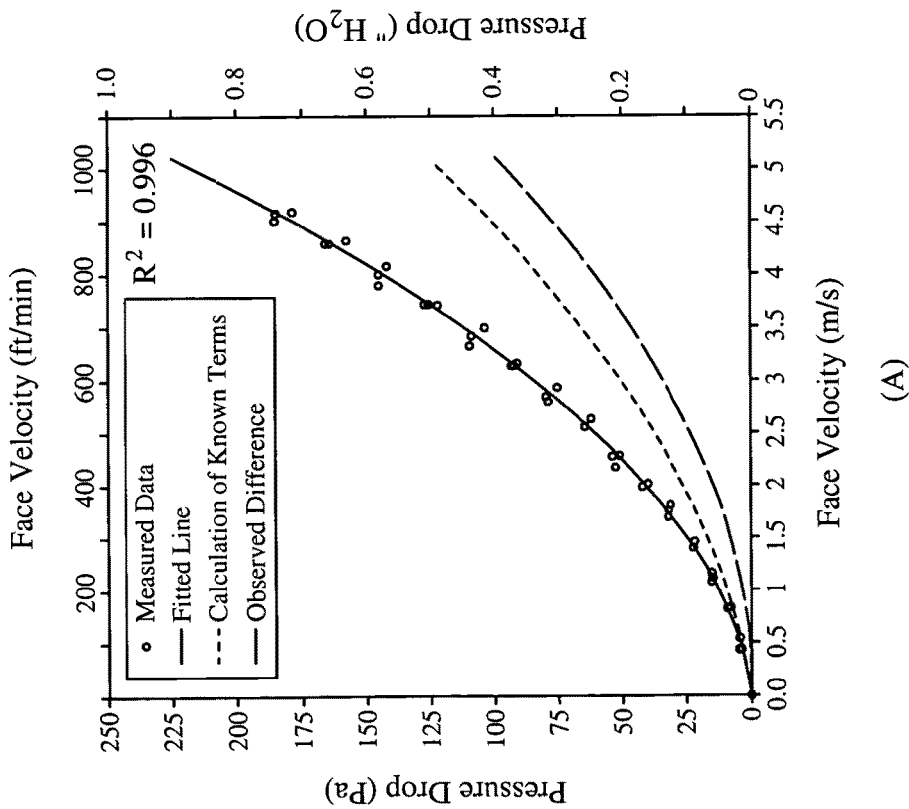

$V_i$ values are computed from the face velocity using the equation of continuity. The coefficients $K_G$, $K_C$, $K_E$, A, and B are tabulated by methods previously discussed. The pleat coefficient of friction for the filter is empirically determined by subtracting these known flow resistances from the experimentally measured total pressure drop. The resulting difference is then plotted versus the reference velocity term ($\tfrac{1}{2}\rho V_3^2$), and the pleat coefficient is inferred from the slope. FIG. 8 graphically displays this methodology for a 491 mm×491 mm×21 mm (19.5 in.×19.5 in.×0.85 in.) #1 media filter with 42 pleats. The solid line is a least-squared regression fitted to the experimental measured pressure drop data. The dashed line is a modeled compilation of the known flow resistances due to the flow through the media, blockage generated by the filter grating, and the channeling due to pleat tip contraction and expansion. The hyphenated line represents the observed difference between the least-squared regression and the modeled line, and it is equivalent to the left-hand side of Equation 10. As seen in FIG. 8B, a linear line results when plotting the observed difference versus $\tfrac{1}{2}\rho V_3^2$ for the filter. The slope of the line is equated to the pleat coefficient of friction.

The resulting coefficient was only valid for a filter with an identical geometry. In order to acquire a more universal coefficient for the model, the pleat coefficient needs to be determined for a wide range of pleat counts, filter depths, media thicknesses, and media permeabilities. Twenty filter variations, manufactured by Quality Filters, Inc. in Robertsdale, Ala., were used to determine the pleat coefficient. The pleat coefficient for each filter is determined by the same method outlined above. An inventory of the filters, geometric parameters, media type, observed pleat coefficients, and R-squared fit are presented in Table 2.

fit scaling factor (0.11) to account for pleat spacing. The friction coefficient is formulated using $V_3$ as the reference velocity.

$$Kp = 0.11(P_L/P_O)^{4/3}(F_{HD}/F_D) \quad (11)$$

$$F_{HD} = (2F_H F_D)/(F_H + F_D) \quad (12)$$

TABLE 2

Summary of Pleat Coefficients

| Filter | Pleats | Height mm (in.) | Width mm (in.) | Depth mm (in.) | Media | Beta, rad | Kp, dimensionless | $R^2$, dimensionless |
|---|---|---|---|---|---|---|---|---|
| A | 22 | 491(19.5) | 491(19.5) | 21(0.85) | #2 | 0.521 | 2.083 | 0.9761 |
| B | 16 | 491(19.5) | 491(19.5) | 44(1.75) | #2 | 0.348 | 1.893 | 0.9498 |
| C | 14 | 491(19.5) | 491(19.5) | 21(0.85) | #1 | 0.819 | 1.329 | 0.9991 |
| D | 19 | 491(19.5) | 491(19.5) | 21(0.85) | #1 | 0.604 | 1.791 | 0.9998 |
| E | 23 | 491(19.5) | 491(19.5) | 21(0.85) | #1 | 0.499 | 2.501 | 0.9998 |
| F | 28 | 491(19.5) | 491(19.5) | 21(0.85) | #1 | 0.410 | 3.335 | 0.9995 |
| G | 32 | 491(19.5) | 491(19.5) | 21(0.85) | #1 | 0.358 | 4.104 | 0.9998 |
| H | 37 | 491(19.5) | 491(19.5) | 21(0.85) | #1 | 0.310 | 4.960 | 0.9997 |
| I | 42 | 491(19.5) | 491(19.5) | 21(0.85) | #1 | 0.273 | 5.573 | 0.9999 |
| J | 47 | 491(19.5) | 491(19.5) | 21(0.85) | #1 | 0.244 | 6.442 | 0.9998 |
| K | 55 | 491(19.5) | 491(19.5) | 21(0.85) | #1 | 0.209 | 7.802 | 0.9997 |
| L | 19 | 491(19.5) | 491(19.5) | 44(1.75) | #1 | 0.293 | 2.311 | 0.9794 |
| M | 34 | 491(19.5) | 491(19.5) | 44(1.75) | #1 | 0.164 | 5.567 | 0.9974 |
| N | 19 | 491(19.5) | 491(19.5) | 88(3.5) | #1 | 0.147 | 3.506 | 0.9992 |
| O | 19 | 491(19.5) | 491(19.5) | 21(0.85) | #3 | 0.604 | 1.837 | 0.9932 |
| P | 32 | 491(19.5) | 491(19.5) | 21(0.85) | #3 | 0.358 | 3.938 | 0.9737 |
| Q | 19 | 491(19.5) | 491(19.5) | 44(1.75) | #3 | 0.293 | 2.466 | 0.9612 |
| R | 32 | 491(19.5) | 491(19.5) | 44(1.75) | #3 | 0.174 | 5.116 | 0.9979 |
| S | 56 | 491(19.5) | 491(19.5) | 44(1.75) | #5 | 0.099 | 10.066 | 0.9906 |
| T | 12 | 491(19.5) | 491(19.5) | 88(3.5) | #4 | 0.232 | 1.881 | 0.9850 |

The formula for the pleat coefficient of friction should be based on Reynolds number, dimensionless geometric ratios, or both. Reynolds number has a prominent effect on the coefficient only when laminar flow is present, yet the flow was almost always turbulent for the test conditions encountered. The Kp coefficient is therefore determined solely on geometric configuration.

Figure 9:
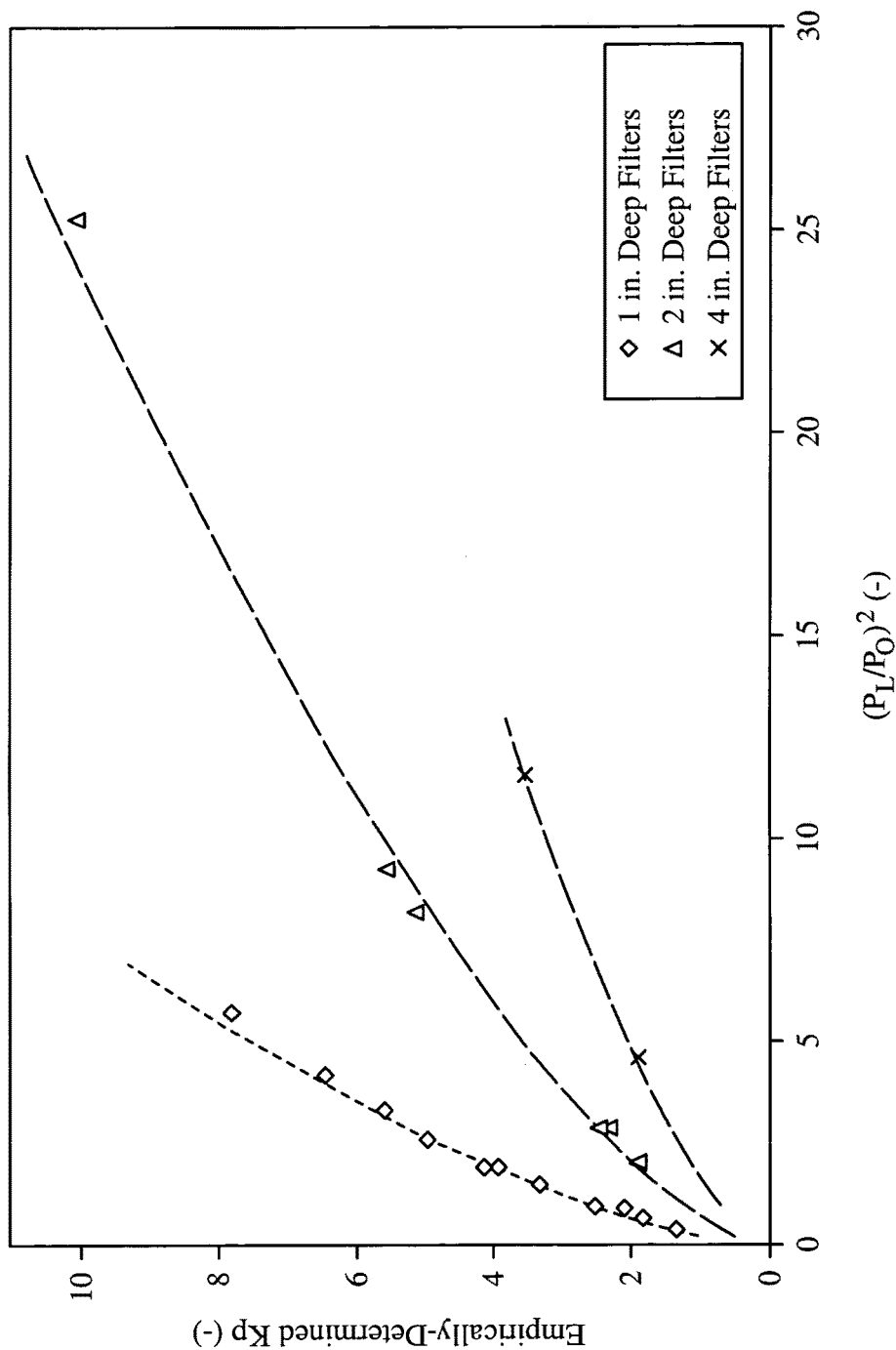
FIG. 9 shows each experimentally-determined coefficient versus the function.

The partial solution to the momentum and mechanical energy balances indicated that the pleat coefficient should be related to the function $(P_L/P_O)^2$. FIG. 9 shows each experimentally-determined coefficient versus the function. As clearly seen, the function does not have a direct correlation to the observed coefficients. This is to be expected due to simplifying assumptions that were made in order to simultaneously solve the mechanical and momentum balances. A general power law trend is visualized between the function and the pleat coefficients. The dashed lines are power law functions with the generic formula $y = mx^{2/3}$. To eliminate the power law fit, the function was rewritten as $y = (P_L/P_O)^z$ with a scaling exponent (Z) of $4/3$ ($x^2 \approx x^{2/3} \approx x^{4/3}$).

Figure 10:
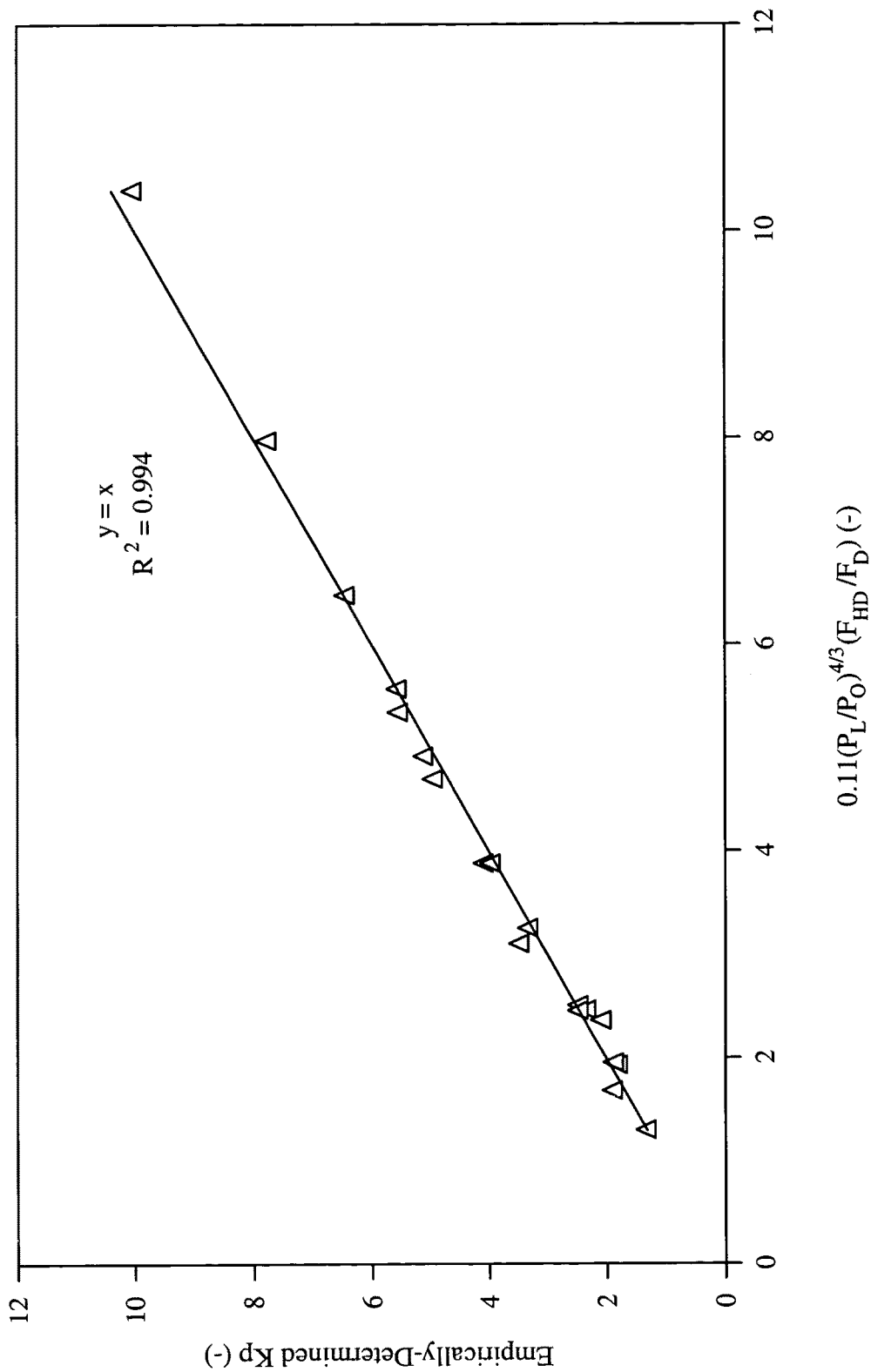
FIG. 10 illustrates a correlation plot between empirically-determined modeled pleat coefficients.

FIG. 9 indicates that a second, supplementary term to account for the depth of the filter is needed to determine the pleat coefficient. As seen in FIG. 9, the coefficients predicted for the two and four inch filters by the ratio function $(P_L/P_O)^2$ are much higher than the empirically-determined values. It was hypothesized that pleating ratio related to the resistance generated by the turn and separation of air in the pleat, but it does not fully account for the area available to make this maneuver. Due to the increased spacing within the two and four inch filters, the air flow is allowed to gradually slow and expand which reduces friction between air molecules and in turn leads to a lower pleat coefficient. A second term is introduced based on the Darcy-Weisbach theory for flow through a duct. The pleat coefficient of friction is accurately modeled with the addition of this dimensionless term and empirically- FIG. 10 illustrates a correlation plot between empirically-determined modeled pleat coefficients.

Since the manner used to formulate the coefficient attributes all remaining resistances to the pleats, it is possible that additional influences are being accounted for by the term. This includes potential deviations generated by the additive method used to factor in the media's resistance and the assessment of the pleat tip's influence on the overall filter resistance. To evaluate the assumption that pleat tips affect the overall pressure drop, the same analysis is performed without factoring in the pleat tip blockage. This is accomplished by removing the $(K_C + K_E)V_3^2$ term from Equation 10. A linear trend is still observed; however, the R-squared value decreases to 0.87. Of particular note, the filters with the largest pleat tip blockage (Types P, R, & S) possess a higher-than-average coefficient indicating that additional resistance effects are being absorbed into the pleat coefficient. This supports the use of a separate term for the pleat tips.

Discussion

Figure 11:
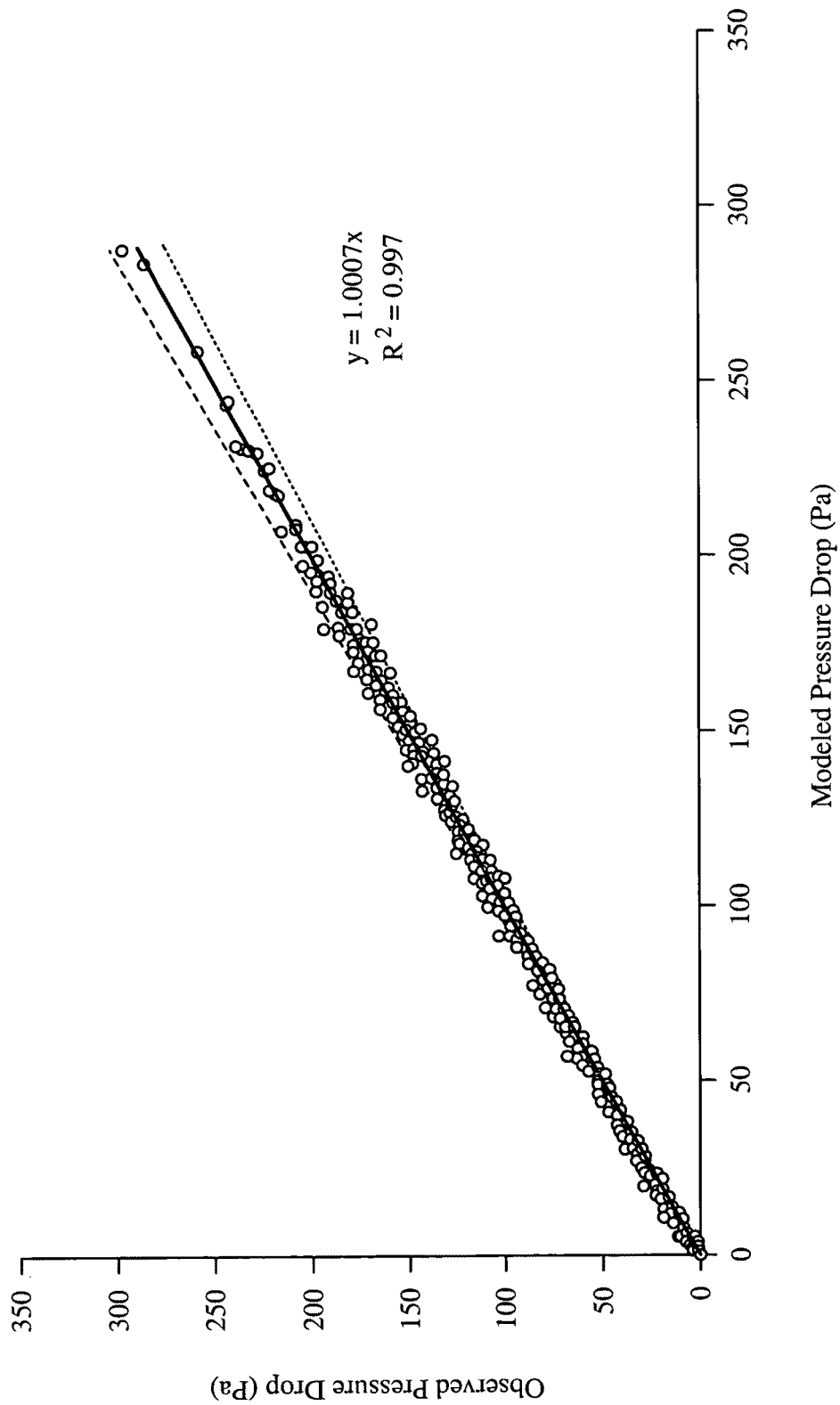
FIG. 11 illustrates a correlation plot between modeled versus observed resistances.

The plot in FIG. 11 utilizes the model to compare the calculated values to all 600 observed pressure drop compiled from the twenty various filter types. A least-squared regression line shows a one-to-one correspondence. The dashed lines represent ±5% from the regression line.

Pleating "U" Curve

Due to the tradeoff of media-induced pressure loss for viscous-induced pressure losses, a pleated filter will experience a minimal pressure drop corresponding at an optimal pleat count. Previous research by Chen, Del Fabbro, Tronville, and Caesar each presented plots of pressure drop versus pleat count that demonstrate this "U" pleating shaped curve. Chen labeled the lower pleat count region to the left of the optimal number as the media-dominated regime. The graph is said to be in the viscosity-dominated regime when a filter possesses more than the optimal number of pleats.

Figure 12A:
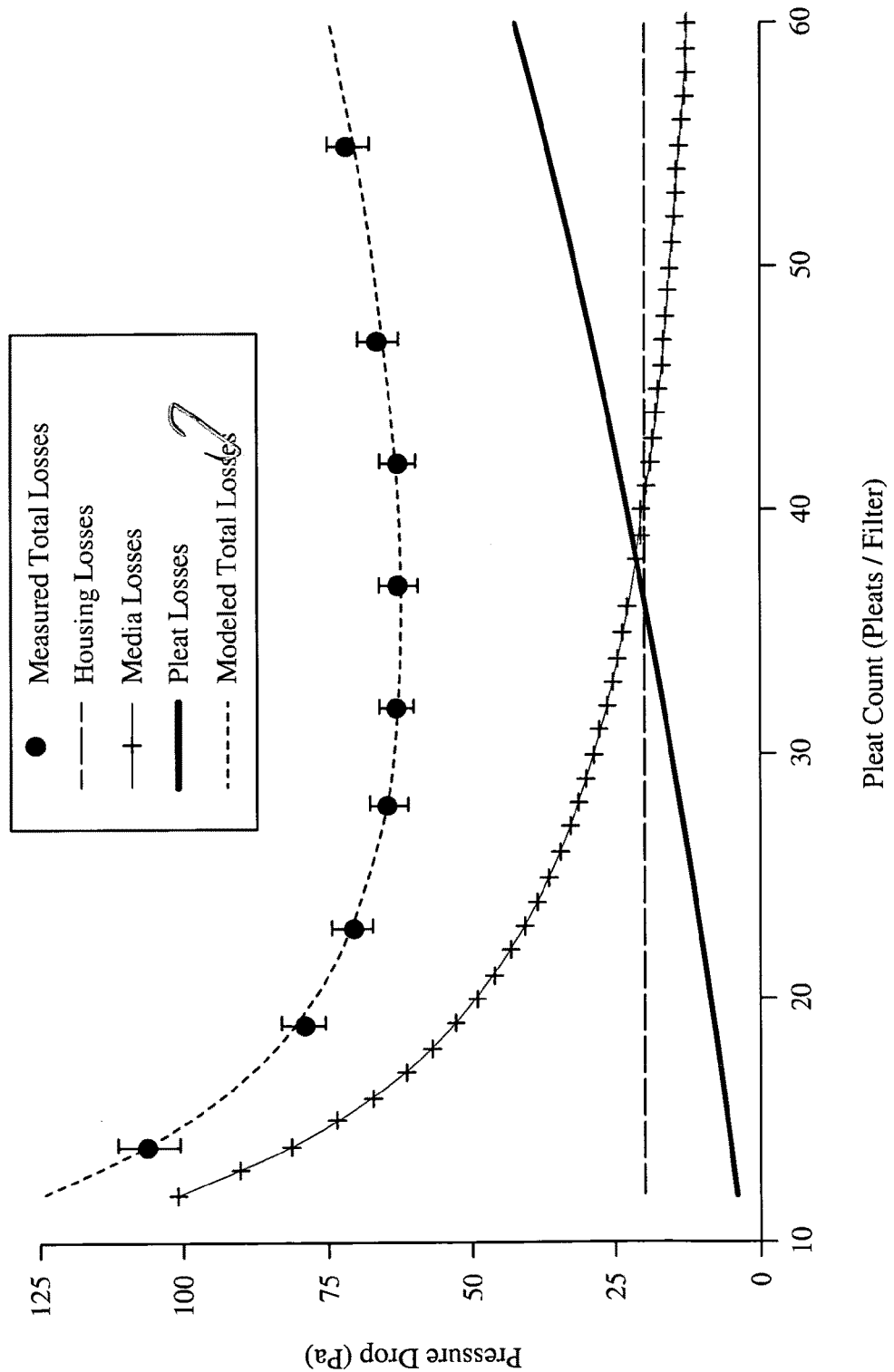
FIG. 12A illustrates a pleating curve.

A conventional pleating "U" curve is generated by modeling a 508 mm×508 mm×25 mm (20 in.×20 in.×1 in.) filter with FM1 media constants and thickness. The graph, FIG. 12A, is computed by holding velocity constant at 2.54 m/s (500 fpm) and varying the pleat count from twelve to sixty pleats per filter. The optimal pleat count correlates to 36 pleats per filter. The model predictions are plotted as lines while the black circles represent the observed total pressure drop of filter types C through K at 2.54 m/s (500 fpm). The modeled resistances due to the pleat contraction and expansion for this filter are left off the graph for clarity because their contribution is very small (<0.5 Pa). The observed flow resistances are fitted with error bars signaling plus or minus five percent of their value. The total modeled resistance fall within the experimental data error bars.

The modeled results of FIG. 12A confirm with the previously published general trends regarding pleated filters. The resistance versus pleat count graph clearly indicates a lowest obtainable resistance (LOR) corresponding to an optimal pleat count. The LOR occurs due to the tradeoff of media resistances for viscous resistances as the pleat count is increased. The graph also partly corroborates Chen's assertion that pleat tip blockage is able to be ignored; however, FM1 is a thin media (~0.5 mm) and the same claim is not able to be made for all media types.

A novel feature of the model is the inclusion of a distinct term for the housing losses. Previous research usually ignores the housing effects, or their influence is masked because they are simply combined in with the geometric losses. This has a two-fold disadvantage from a filter design perspective. First, the housing resistance is wrongfully attributed to other geometric design parameters such as pleat height or pleat pitch. This artificially augments the actual influence of these geometric parameters leading to errors in design estimates. Second, the nature of the housing resistance acts in a different manner than the other geometric losses. Within the parameter range explored, the structural pressure drop essentially serves as a fixed resistance and its influence does not change with pleat count. All other geometric resistances increase with pleat count. A small increase in their resistance due to the incorporation of the grating losses becomes further skewed as pleat count varies. By identifying and separating the grating contribution, the model provides a better understanding of the individual resistances allowing enhanced analysis, improved design, and increased performance.

One such design improvement would be the elimination of the structural housing. If the same filter could be adequately constructed without the housing, the total pressure drop at the optimal pleat count would be reduced by thirty percent. However, the structural stability of the filter might become compromised due to the elimination of the grating. This is especially true since most filters are loaded with dirt until a final pressure drop of 249 Pa is obtained. A simple solution is the addition of a wire mesh to the front and back to improve stability. Since the wire is primarily an open void, the net resistance effects would be similar to a small increase in the media constants. A second, similar design improvement would be to eliminate just the front grating. The back grating, in conjunction with the wire mesh, should be sufficient to support the filter media. The removal of the front grating would net a 15% reduction in the overall initial resistance.

An accurate model is able to also identify various design strategies to minimize material costs, minimize energy consumption, or maximize filter useful life of an adsorbent-entrapped filter while maintaining an acceptable initial pressure drop. FIG. 12A indicates the presence of a semi-flat valley between 27 and 47 pleats that highlights these design goals. In this valley, the initial pressure drop hovers around a starting resistance of 62 Pa. At the low pleat count end, a filter with 27 pleats is able to be constructed that will perform at an adequate pressure drop without incurring a higher production cost due to increased material costs. This is especially useful for a filter employing expensive adsorbent or catalyst materials. The most energy efficiency filter is able to be manufactured by increasing pleat count to the LOR of 36 pleats; however, it should be noted that the overall energy consumption is greatly affected if these gas phase filters become loaded with debris. The high end of the valley offers a filter with the largest available filtration area and adsorbent loading without sufficiently increasing the initial pressure drop. The ability to locate and work within this valley demonstrates the utility of an accurate pressure drop model to a filter designer.

Filter Bank "U" Graph

Figure 12B:
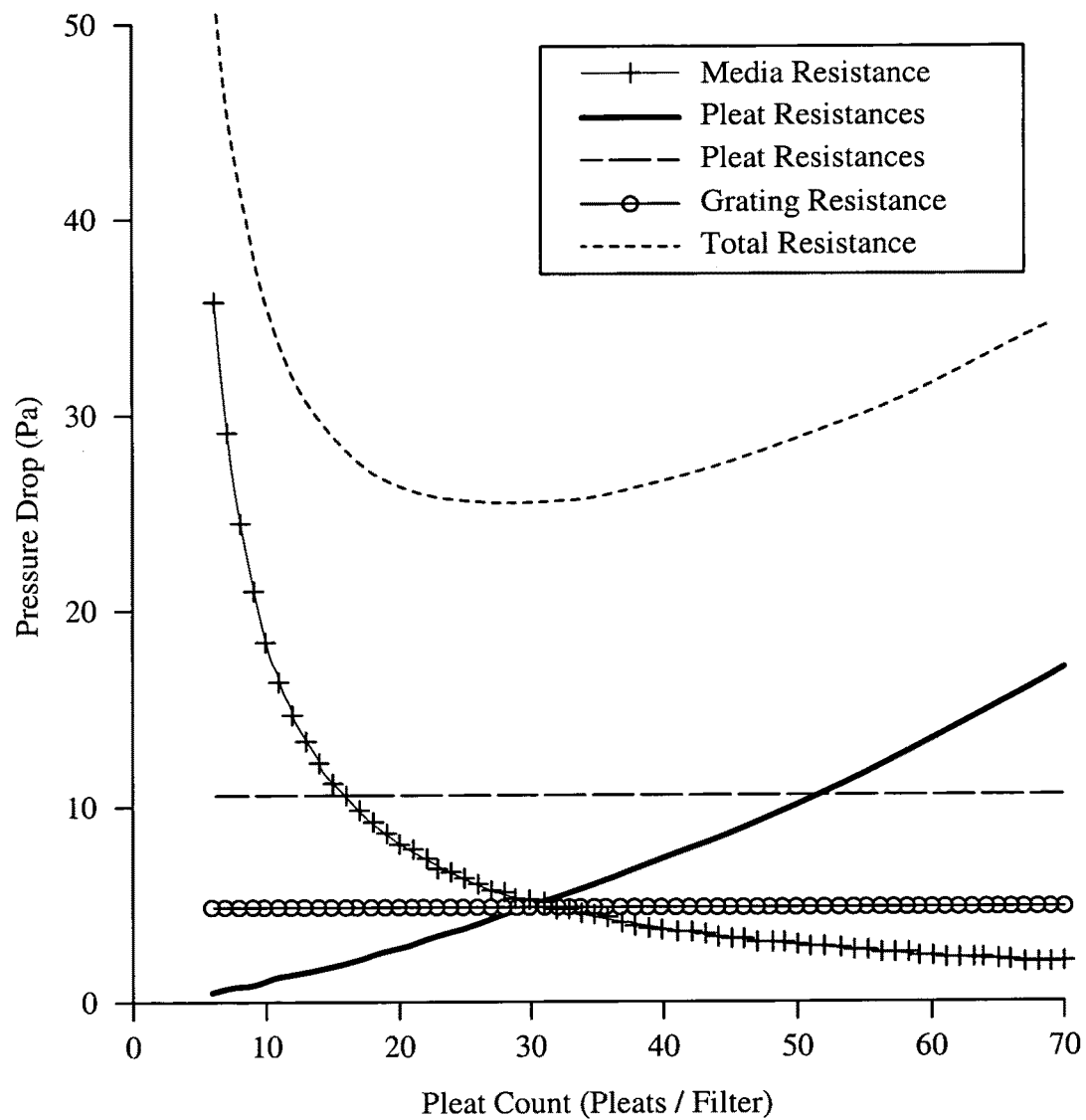
FIG. 12B illustrates a modeled total pressure resistance for a "V" bank.

FIG. 12B illustrates a modeled total pressure resistance for a "V" bank. Analogous to the single filter "U" curve, the individual resistance contributions are present below for a "V" configuration bank modeled at 2.54 m/s with a filter height of 5.08 cm while the pleat count is varied between 6 and 70 pleats per filter. The media, grating and pleat resistances all behave in a similar manner. The slot resistances (pressure drop generated by flow into, through, and out of the slots) act as a fixed resistance and are not a function of pleat count. The slot resistance accounts for 41% of the total pressure drop at the optimal pleat count. Similar to the single filter's "U" curve, the bank curve possesses a valley where the pressure drop does not drastically change. Between 14 and 54 pleats per filter, the pressure drop ranges from 25 Pa to 30 Pa. Each filter is able to be pleated an additional forty times equating to a 3.85 fold increase in media area before the pressure drop rises above 30 Pa.

Location of the Optimal Pleat Count

Although it is able to be used as a general heuristic, the optimal pleat count does not simply exist where the media and geometric resistances are equal. For example, the optimal pleat count in FIG. 12A was 36 pleats, yet the media and pleat resistances were equal at 38 pleats. The lowest obtainable resistance and the optimal pleat count actually occurred when the total pressure drop's rate of change with respect to pleat count is zero. Since Equation 9 is composed of polynomials, the model is able to be broken down into individual terms and the first derivative with respect to pleat count is able to be readily computed.

1st Derivative:

$$\frac{\partial \Delta P_F}{\partial P_C} = \frac{\partial (\rho K_G V_1^2)}{\partial P_C} + \frac{\partial (1/2 \rho K_C V_3^2)}{\partial P_C} + \frac{\partial (1/2 \rho K_E V_3^2)}{\partial P_C} + \frac{\partial (1/2 \rho K_P V_3^2)}{\partial P_C} + \frac{\partial (V_4)}{\partial P_C} \quad (13)$$

$$\frac{\partial \Delta P_F}{\partial P_C} = \text{Term1} + \text{Term2} + \text{Term3} + \text{Term4} + \text{Term5} + \text{Term6} \quad (14)$$

The grating contribution's (Term 1) first derivative is zero because it is not a function of pleat count. The first derivative of the viscous/geometric effects (Terms 2, 3, and 4) is positive while the media resistances (Terms 5 and 6) are continuously negative first derivatives with respect to pleat count. Equation 14 is able to be rearranged to give Equation 15 since the left hand side is equal to zero at the optimal pleat count.

$$-\left[1/2\rho\frac{\partial(\rho K_C V_3^2 + K_E V_3^2 + K_P V_3^2)}{\partial P_C}\right] = \frac{\partial(AV_4 + B_4^2)}{\partial P_C} \quad (15)$$

Figure 13:
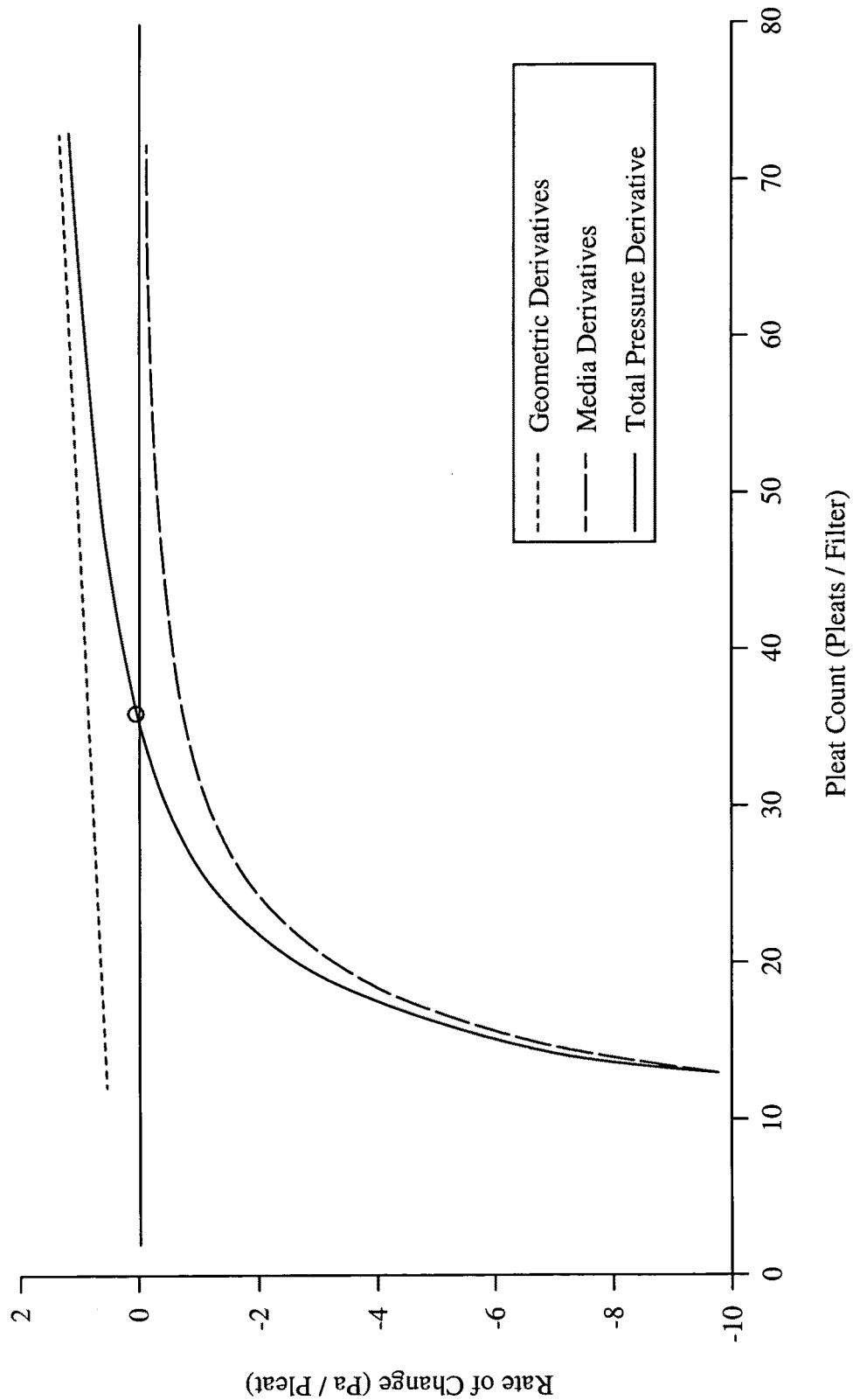
FIG. 13 is a graphical representation generated by taking the first derivatives of the model.

FIG. 13 is a graphical representation generated by taking the first derivatives of the model as shown by Equation 13. Each derivative is calculated while holding the filter dimensions, face velocity, and media properties constant while changing pleat count between 12 and 70 pleats. The conditions used to generate the FIG. 13 are the same as those used to generate FIG. 12A (FM1 media constants, 2.54 m/s face velocity, & 508 mm×508 mm×25 mm dimensions). FIG. 13 clearly indicates the balance between viscous and media-dominated resistances.

Effects of Permeability

With decreasing media permeability, there is an increase in the optimal pleat count and the lowest obtainable pressure drop. Decreasing permeability enlarges the magnitude of the media term's first derivative. The optimal pleat count is shifted right in order for the magnitude of the viscosity's first derivative to counteract the increase in the media term.

Effects of Media Thickness

By fixing media constants, a uniform resistance through the media is maintained and the individual effects of media thickness are able to be discerned without observing additional phenomena.

By increasing the media thickness, the optimal pressure count is shifted to a lower pleat count but at a higher pressure resistance. Increasing the media thickness causes the pleat opening to close at a faster rate in addition to enlarging the area blocked by each pleat tip; thus, the viscosity term's first derivative is increased sizably.

In actuality, compressing the media's thickness also decreases the permeability and leads to a competing phenomenon. Condensing the media affects the viscous terms and allows a lower optimal pressure drop to be reached; however, an increase in permeability influences the media term and increases the lowest obtainable pressure drop. Depending on the filtration needs and media employed, it is sometimes beneficial to reduce the thickness.

Effects of Pleat Height

By holding constant the flow rate (2.54 m/s), media constants (A=8.8, B=20.5), and thickness (1 mm), the model is employed to study the effects generated by varying the pleat height. Results indicate that increasing pleat height decreases the overall pleat count and obtainable pressure drop.

The lowest initial pressure drop is achieved with a 10.16 cm filter. A change to the pleat height influences both the media and the viscosity terms' first derivative. At low pleat counts, the additional pleat height greatly increases the available filtration area and effectively removes the influence of the media term without incurring a significant viscous resistance. This is not the case with higher pleat counts where the viscous effects are heightened due to longer pleats. The viscous effects are evident by the steep pressure rise in the viscosity-dominated region of higher pleat heights.

Effect of Additional Filters

Using the multi-filter bank model, the effect of additional filters on the "U" curve are examined while keeping media properties (A=6.3, B=16.8, 4 mm thickness), flow rate (2.54 m/s), and pleat height (5.08 cm) constant. The results are presented in FIG. 14 with optimal pleat counts denoted by "X."

The single filter displays the typical "U" graph. As the total number of filters is increased, the curves lose their distinctive "U" shape and begin to flatten out due to the dramatic reduction of the velocity through the filter. The effect is more pronounced in the media term, but the viscosity's term is also decreased causing a delay in the onset of pressure rise. The viscosity-induced resistance in the four and six filter system does not take affect until the pleat openings become very small (<1 cm).

The strength of a multi-filter bank lays in its ability to reduce the influence of media effects within the filtration system. A multi-filter bank is a prime example of a filtration system that is able to benefit from compressing the media. For media with a high load of sorbent and/or catalyst, the utility of the media is often limited by the media resistance generated by the drag forces on the entrapped particles. The multi-filter bank serves as a platform to allow the utilization of these high pressure drop materials.

Figure 14:
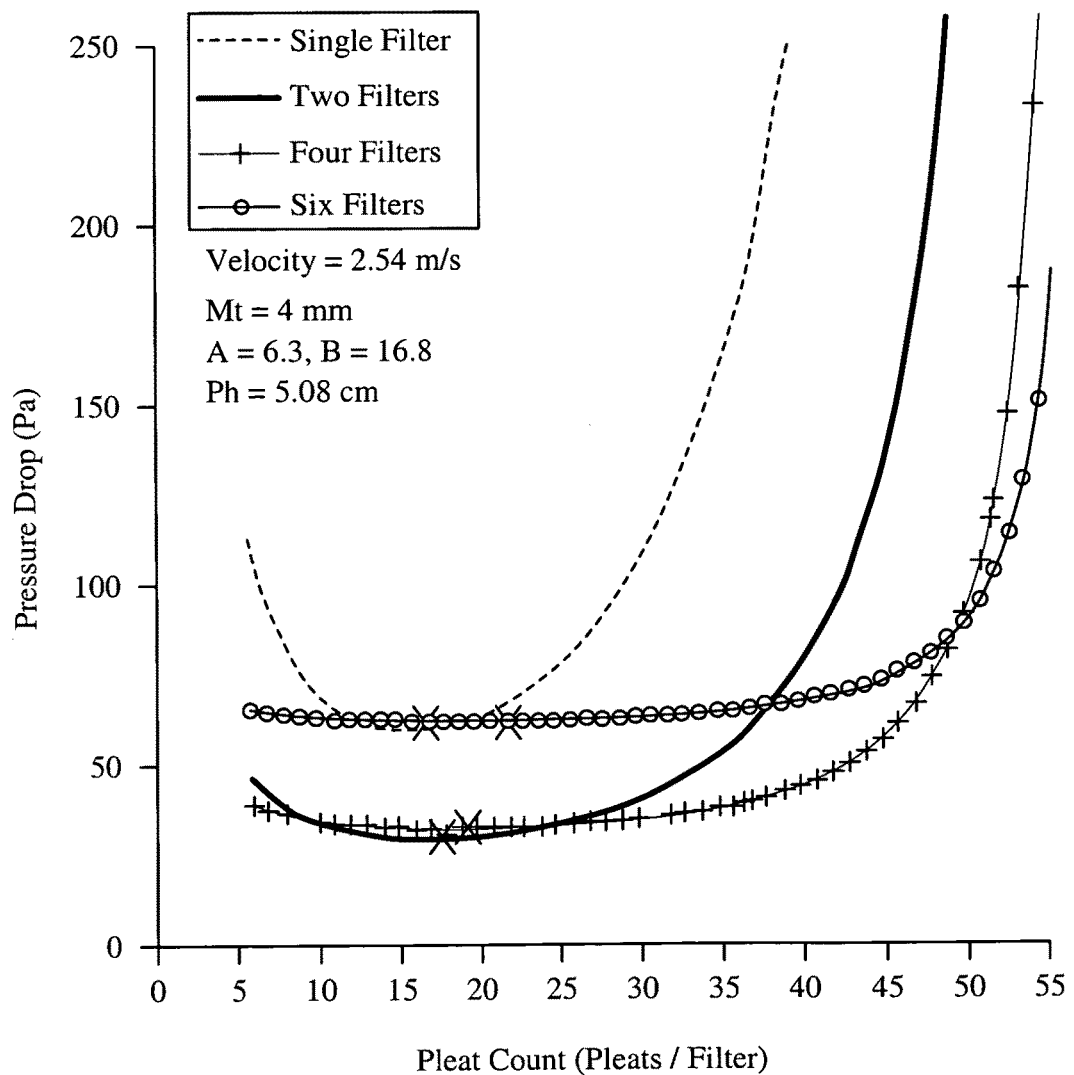
FIG. 14 demonstrates the multi-filter bank utility.

FIG. 14 demonstrates the multi-filter bank utility. A two and four filter bank are able to package 283% and 657% more media area than a single filter while operating at half the initial pressure drop. By utilizing a six filter bank over a traditional pleat filter, the filtration area is able to be increased by 750% over a single filter system without noticeably increasing the pressure drop; however, the six filter bank is able to accommodate 10.8 square meters (1588%) of media before reaching a resistance above 75 Pa.

Structure and Modifications

FIGS. 15A-D illustrate a filter box with a MESA. A filter box 1500 being a frame that fits into a duct (existing or otherwise) and holds two or more individual and readily replaceable filter elements 1502. In some embodiments, the number of elements 1502 is an even number. The box 1500 is able to be configured to retrofit into an existing duct or plenum originally configured to hold just one traditional element.

Since the surface fluid velocity entering each element 1502 is lower than that encountering a single element, the thickness/permeability/pressure drop of media 1504 is able to be increased and optimized in unique regimes and via a novel methodology in order to meet a given overall design target/specification of pressure drop versus flow rate. Such design targets are for example (500 fpm at 0.25 to 1.0 inches of water pressure drop for air handlers in commercial buildings, and 300 fpm at 0.1 to 0.2 inches of water pressure drop for residential air handlers).

The media 1504 is uniquely optimized to provide more performance (e.g. more g/m2 of catalyst or sorbent loading, or a much higher level of filtration efficiency such as particulate removal). Due to the lower velocity, the pleat count is also able to reside in a unique regime not feasible, obvious or anticipated for a single filter element.

The result of a populated filter box (MESA) 1500 provides a unique and high level of performance that provides a mathematical maximum in the amount of sorbent, catalyst or filtration medium contained (and thus the amount of contaminants removed) at a specified flow rate and pressure drop.

Single filter elements and MESA's are able to be designed for use with commercially available media, unique multilayers/laminates of commercially available media, microfibrous entrapped catalyst/sorbent media and laminates thereof, as well as composite beds including thin packed beds of large particulates following by layers of microfibrous or other polished media.

Individual elements and MESA's are designed with a particular set of individual media, arranged in a particular order, so as to provide high efficiency treatment of a cocktail of contaminants that would otherwise poison or pass through, unimpeded, a single composition element.

FIG. 15A illustrates a normal bank configuration and FIG. 15B illustrates a modified design. The transition is generated by adding a board or panel 1506 to each front edge. In some embodiments, the boards/panels are 491 mm (19.5")×585 mm (23") or another size. The boards/panels are sealed to the duct walls and the element's front edge to eliminate friction due to uneven surfaces. A slightly larger filter box 1500' is constructed to accommodate the extra length of the slant modification.

Tests were conducted on "V" configuration banks using 491 mm×491 mm (19.5"×19.5") elements with depths of 44 mm (1.75") and 89 mm (3.5"). A pressure drop curve was first recorded for the normal bank geometry, and then a second pressure drop curve was measured for the modified bank entrance. The observed decrease due to the modification closely correlated to the expected resistance generated by a sudden contraction. When outfitted with errors bars of ±5%, all observed values overlapped the calculated resistance line; therefore, the viscous loss equation combined with the friction coefficient for a sudden contraction accurately modeled the pressure drop generated by the element's edge walls. FIGS. 15C and 15D illustrate air flow of the bank of filters and the modified bank of filters, respectively.

Figures 16A, 16B:
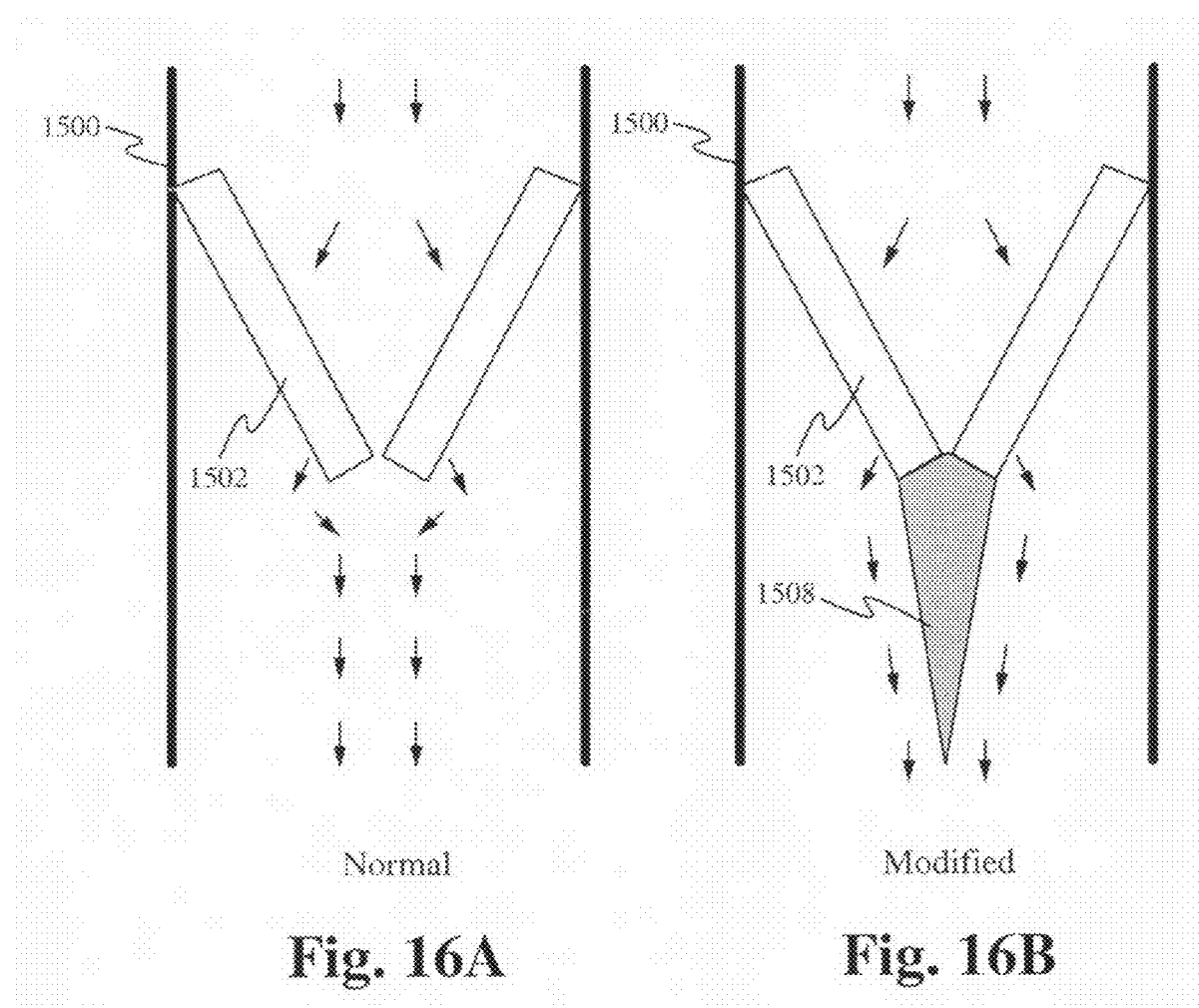
FIGS. 16A-B illustrate a modified filter box.

FIGS. 16A-B show a normal version and an additional modified version. The modified outlet design changes the sudden expansion out of the bank into a gradual transition by adding a tail fin 1508. In some embodiments the tail fin 1508 composed of two 491 mm (19.5") high by 585 mm (23") wide boards to the back of the filter's edges. The flow shown in FIGS. 16A-B indicate that the expansion out of the bank was accurately modeled by a sudden expansion coefficient due to the good correlation between the computed and observed pressure difference. The observed decrease in resistance values were fitted with error bars of ±5%. The observed values were higher than the calculated values at lower velocities, yet the deviation between the two is never larger than 0.13 Pa. The resolution of the pressure transducer was 0.25 Pa; thus, this deviation could be the result of lack of sensitivity of the equipment. Equations 14 and 15 were used to compute the area used in Equation 10.

Additional variations include many different combinations of media types to generate unique filtration products.

Modeling System

Figure 17:
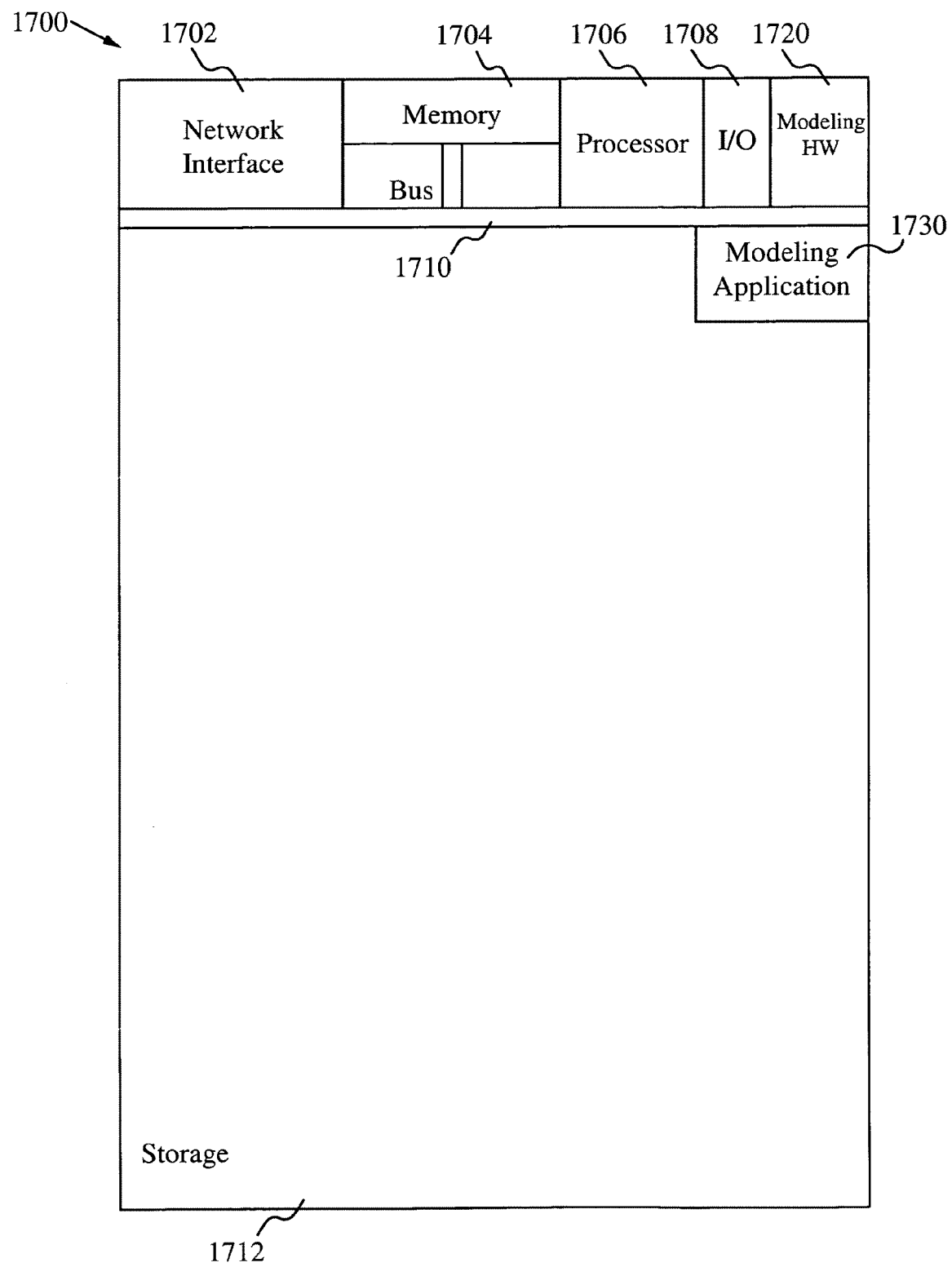
FIG. 17 illustrates a computing device for implementing a modeling system.

FIG. 17 illustrates a computing device 1700 configured for implementing a modeling system. The computing device 1700 is able to be used to acquire data and develop a model based on the data. In general, a hardware structure suitable for implementing the computing device 1700 includes a network interface 1702, a memory 1704, a processor 1706, I/0 device(s) 1708, a bus 1710 and a storage device 1712. The choice of processor is not critical as long as a suitable processor with sufficient speed is chosen. The memory 1704 is able to be any conventional computer memory known in the art. The storage device 1712 is able to include a hard drive, CDROM, CDRW, DVD, DVDRW, flash memory card or any other storage device. The computing device 1700 is able to include one or more network interfaces 1702. An example of a network interface includes a network card connected to an Ethernet or other type of LAN. The I/0 device(s) 1708 are able to include one or more of the following: keyboard, mouse, monitor, display, printer, modem, touchscreen, button interface and other devices. Modeling application(s) 1730 used to perform the improved color effects method are likely to be stored in the storage device 1712 and memory 1704 and processed as applications are typically processed. More or less components shown in FIG. 17 are able to be included in the computing device 1700. In some embodiments, modeling hardware 1720 is included. Although the computing device 1700 in FIG. 17 includes applications 1730 and hardware 1720 for modeling, the modeling method is able to be implemented on a computing device in hardware, firmware, software or any combination thereof. In some embodiments, the modeling application(s) 1730 include several applications and/or modules.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

A general mathematical model relates a number of critical design parameters both for the "box" as well as the individual elements and the physical characteristics of the media itself. These parameters include, among others: media, thickness, media permeability, overall thickness of each element, number of pleats in each element, physical size of each element, structural design/packaging/and surface area blocking of each element, number of individual elements within an optimized MESA, consideration of allowable or design fluid velocities and pressure drops, intended service life, single pass removal efficiency and cost related design targets of the MESA (media cost, element cost, utilities cost) and more.

The model where the mathematical understanding of the MESA is used as a design tool to optimize & specify unique combinations of media properties and relationships not previously envisioned or anticipated in this manner, and to therefore be able to specify new and even higher performance MESA designs and operating specifications.

Figure 18:
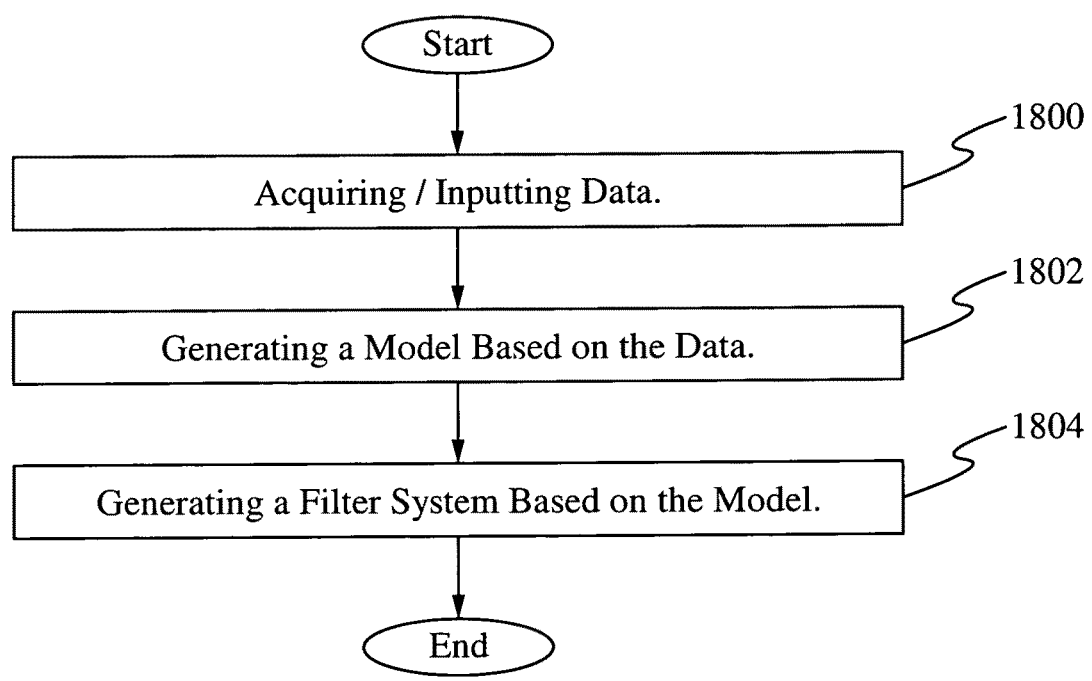
FIG. 18 illustrates a flowchart of a method of implementing a modeling system.

FIG. 18 illustrates a flowchart of a method of implementing a modeling system. In the step 1800, data is acquired and/or input. Data acquired or input includes media type, media thickness, permeability, number of pleats, number of filter elements, pleat height, pressure drop, and other relevant data. In some embodiments, some of the data is input while some of the data is determined based on the model. In the step 1802, a model is generated based on the data. The model capable of estimating pressure drop for flow through a pleated filter is able to be used as a design tool to predict minimum initial pressure drop, maximum filtration area, and preferred media properties with respect to permeability versus thickness thus allowing the filtration system's dirt holding capacity, filtration efficiency and operational energy cost to be improved. In the step 1804, a filter system is generated/configured based on the model. The filter system will have the appropriate media, configuration, and other desired aspects.

To utilize MESA's, they are able to be employed in pre-existing ductwork as both a particulate and/or airborne molecular containment filtration system. The use of high resistance filtration/adsorbent media and design architectures that would be otherwise impractical in a traditional filter element are able to be used. With interchangeable filter elements, the unit's framework is able to be reutilized; thus, eliminating the additional cost associated with current sealed units.

While commercially available filter products include "V" shaped channels that extend into ductwork, the implementation described herein includes removable filtration elements and is able to use commonly available pleated filter elements. Commercially available units primarily use high efficiency media packaged with a minipleat configuration. Each element is pleated as tightly as possible; thus, the units are not optimally designed. The MESA's described herein provide similar filtration efficiency while operating at a fraction of the pressure drop. MESA's are able to also use commercially available pleated filters as replacement elements.

To utilize the modeling implementation, desired or necessary data is gathered. Then, the appropriate calculations are made. Based on the calculations, the appropriate configuration, materials, and other features are implemented to achieve an efficient filtering product.

In operation, a model for estimating pressure drop for flow through a pleated filter is able to be used to explore novel packaging regimes for multi-filter banks and determine unique, higher performance relationships between media thickness and permeability at standardized flow rates and pressure drops used in the HVAC industry. The rigorous model is developed based on the physical properties of the media and pleated filter design. The model predicts pressure resistance for twenty different single filters and twenty-three multi-filter banks with 99% accuracy. Since the model does not employ non-transferable parameters, accurate pressure drop predications are able to be made solely on empirical data obtained for media thickness and permeability. The model agrees with previously published research in the field.

Model parameters such as pressure drop, pleat height, and pleat count directly influence operational cost, available media area, and performance. A model encompassing these influential design parameters and the effects of their variation are able to serve as a design tool for filtration units. At a fixed flow velocity, the model is used to locate the lowest obtainable resistance and corresponding optimal pleat count for a given media. In HVAC systems where air velocity and allowable pressure drop are fixed, the model is able to predict the maximum filtration area and sorbent loading, thereby increasing dirt holding capacity and useful life. The model is able to further serve as a design tool for media construction to back-calculated preferred media properties with respect to permeability versus thickness to achieve a desired operational condition. The end benefits to an adsorbent filtration design are an increase in available sorbent, decrease in material cost, and/or a reduction of operational energy costs.

High resistance media such as fiber entrapped sorbents, catalysts or antimicrobials are often impractical due to the large drag forces present within the media and their lack of specific capacity. By packaging the media in a multi-filter bank, the media-induced effects are drastically reduced allowing the use of larger masses and areas of these materials. The model is able to be used to explore novel packaging regimes for multi-filter banks and determine unique, higher performance relationships between media thickness and permeability at standardized flow rates and pressure drops used in the HVAC industry.

As described above, in some embodiments, multiple filters are utilized in a unit. In some embodiments, when multiple filters are implemented, the filters are in even multiples such as 2, 4, 6, 8 and so on. In some embodiments, when two filters are used, the configuration is "V" shaped. In some embodiments, when more than two filters are used, the configuration is a multiple "V" configuration, such as a "VV" configuration or a "W" configuration. In some embodiments, a "VW" configuration is used or a "VVV" configuration is used. Any "V" shape variant configuration is possible, and other configurations are possible also.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device comprising:
   a. a container comprising an inlet and an outlet;
   b. a plurality of individually removable filters contained in a V-shape configuration within the container, wherein characteristics and a configuration of the filters is configured based on a model to optimize efficiency of the filters and each individually removable filter comprises a single filter panel, wherein the filters each comprise an upstream face that faces the input of the container and a downstream face that faces the outlet of the container and the one or more panels are each positioned to guide input air from the inner walls of the container to the upstream face of the filter coupled to the panel; and
   c. one or more panels each coupled to an edge of one of the plurality of filters and the inner walls of the container.

2. The device of claim 1 wherein the filters comprise a media.

3. The device of claim 2 wherein the media is optimized to provide at least one of increased sorbent loading and filtration efficiency.

4. The device of claim 3 wherein the device attains a mathematical maximum of an amount of sorbent, catalyst or filtration medium contained at a specified flow rate and pressure drop.

5. The device of claim 1 wherein the filters comprise at least one of commercially available media, unique multilayers/laminates of commercially available media, microfibrous entrapped catalyst/sorbent media and laminates, and composite beds of thin packed beds of large particulates followed by layers of microfibrous media.

6. The device of claim 1 wherein the filters are designed with a particular set of individual media and/or arranged in a particular order to provide high efficiency treatment of a cocktail of contaminants that would otherwise poison or pass through, unimpeded, a single composition element.

7. The device of claim 1 wherein the plurality of filters comprise an even number of filters.

8. The device of claim 1 further comprising a fin coupled to an edge of two of the plurality of filters, the fin configured to improve air flow.

9. The device of claim 1 wherein the container is employed in a pre-existing ductwork.

10. The device of claim 1 wherein the model receives as input at least one of a media type, a media thickness, a pleat count, a pleat height, a filter count and a pressure drop.

11. The device of claim 1 wherein the model determines at least one of a media type, a media thickness, a pleat count, a pleat height, a filter count and a pressure drop.

12. The device of claim 1 wherein the model determines the total resistance through the device based on a summation of component resistances including the flow into slot inlet resistance, the flow from the slot inlet to filter face resistance, the flow across front grating resistance, the flow from front grating to plate inlet resistance, the flow from the plate inlet to the media surface resistance, the flow through the media resistance, the flow from the media surface to the pleat outlet resistance, the expansion from the pleat outlet into back grating resistance, the flow across the back grating resistance, the flow from the filter face to the slot outlet resistance and the flow out of the slot resistance.

13. A system comprising:
   a. a computing device configured to generate a model for filter devices, wherein the model incorporates a housing losses term that corresponds to the effects of the front and the back of the housing of filter devices on the filter efficiency; and
   b. a filter device developed from the model, wherein characteristics and a configuration of the filter device are configured based on the model to optimize efficiency of the filter device.

14. The system of claim 13 wherein the filter device comprises:
   a. a container; and
   b. a plurality of filters contained within the container, the plurality of filters configured based on the model.

15. The system of claim 14 wherein the plurality of filters comprise an even number of filters.

16. The system of claim 14 wherein the plurality of filters form a V-shape configuration.

17. The system of claim 14 wherein the plurality of filters are each removable.

18. The system of claim 14 further comprising a set of panels coupled to the plurality of filters, the set of panels configured to improve air flow.

19. The system of claim 14 further comprising a fin coupled to the plurality of filters, the fin configured to improve air flow.

20. The system of claim 14 wherein the container is employed in a pre-existing ductwork.

21. The system of claim 13 wherein the model receives as input at least one of a media type, a media thickness, a pleat count, a pleat height, a filter count and a pressure drop.

22. The system of claim 13 wherein the model determines at least one of a media type, a media thickness, a pleat count, a pleat height, a filter count and a pressure drop.

* * * * *